United States Patent [19]
Li

[11] Patent Number: 6,166,455
[45] Date of Patent: Dec. 26, 2000

[54] LOAD CURRENT SHARING AND CASCADED POWER SUPPLY MODULES

[75] Inventor: Thomas Li, Mountain View, Calif.

[73] Assignee: Micro Linear Corporation, San Jose, Calif.

[21] Appl. No.: 09/232,187

[22] Filed: Jan. 14, 1999

[51] Int. Cl.[7] .................................................. H02J 1/04
[52] U.S. Cl. ............................ 307/43; 307/44; 307/52; 307/60
[58] Field of Search ................. 307/43, 44, 52, 307/53, 55, 60, 65

[56] References Cited

U.S. PATENT DOCUMENTS

| | | | |
|---|---|---|---|
| 3,294,981 | 12/1966 | Bose | 307/88.5 |
| 3,539,902 | 11/1970 | Hickling | 321/9 |
| 3,603,809 | 9/1971 | Uchiyama | 307/228 |
| 3,660,753 | 5/1972 | Judd et al. | 323/22 T |
| 3,742,330 | 6/1973 | Hodges et al. | 321/9 A |
| 3,832,643 | 8/1974 | Van Heyningen et al. | 330/15 |
| 3,883,756 | 5/1975 | Dragon | 307/265 |
| 4,035,710 | 7/1977 | Joyce | 363/37 |
| 4,177,389 | 12/1979 | Schott | 307/64 |
| 4,293,904 | 10/1981 | Brooks et al. | 363/86 |
| 4,311,954 | 1/1982 | Capel | 323/222 |
| 4,356,403 | 10/1982 | Mohat | 307/60 |
| 4,392,103 | 7/1983 | O'Sullivan et al. | 323/222 |
| 4,407,588 | 10/1983 | Arichi et al. | 368/118 |
| 4,422,138 | 12/1983 | Kornrumpf | 363/21 |
| 4,437,146 | 3/1984 | Carpenter | 363/21 |
| 4,454,558 | 6/1984 | Huddart | 361/153 |
| 4,456,872 | 6/1984 | Froeschle | 323/286 |
| 4,529,927 | 7/1985 | O'Sullivan et al. | 323/222 |
| 4,618,779 | 10/1986 | Wiscombe | 307/60 |
| 4,628,438 | 12/1986 | Montague | 363/134 |
| 4,651,231 | 3/1987 | Douglas, Jr. | 358/342 |
| 4,661,896 | 4/1987 | Kobayashi et al. | 363/24 |
| 4,672,303 | 6/1987 | Newton | 323/285 |
| 4,672,518 | 6/1987 | Murdock | 363/21 |
| 4,674,020 | 6/1987 | Hill | 363/21 |

(List continued on next page.)

FOREIGN PATENT DOCUMENTS 60-22490  2/1985  Japan ............................................ 5/41

OTHER PUBLICATIONS

"ML 4824 Power Factor Correction and PWM Controller Combo," Micro Linear Corporation, May 1997.

"Load Share Controller, UC1902, UC2902, UC3902: Preliminary," Unitrode Integrated Circuits, Merrimack, NH, Oct. 1996.

(List continued on next page.)

*Primary Examiner*—Josie Ballato
*Assistant Examiner*—Robert L. Deberadinis
*Attorney, Agent, or Firm*—Haverstock & Owens LLP

[57] ABSTRACT

A modular power supply which distributes responsibility for supplying current to a load among two or more power supply modules having a common output node. One of the power supply modules which supplies the lowest level of current to the load functions as the master while the remaining power supply modules each function as a slave. A load share bus which interconnects all the power supply modules is driven by the master with a signal representative of the level of current supplied by the master. Each slave module attempts to reduce its output current to a level which is a predetermined offset above the level of current supplied by the master while a regulated voltage is maintained at the common output node. Any one of the modules can become the master, though once the system is operating, the predetermined offset generally prevents the roles from changing. Should one of the power supply modules fail such that its output current is uncontrolled, this power supply module will not be the master. According to an aspect of the invention, a power supply module can be inserted when there are already other power supply modules present and actively supplying power to the load. According to another aspect of the invention, rather than providing a common load share bus, a plurality of power supply modules are cascaded in a line, a loop a tree. Each module, however, supplies power to a load via a common output terminal.

39 Claims, 10 Drawing Sheets

U.S. PATENT DOCUMENTS

| | | | |
|---|---|---|---|
| 4,677,366 | 6/1987 | Wilkinson et al. | 323/222 |
| 4,685,043 | 8/1987 | Mehnert | 363/43 |
| 4,691,159 | 9/1987 | Ahrens et al. | 323/222 |
| 4,695,935 | 9/1987 | Oen et al. | 363/21 |
| 4,717,833 | 1/1988 | Small | 307/44 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,837,495 | 6/1989 | Zansky | 323/222 |
| 4,841,220 | 6/1989 | Tabisz et al. | 323/282 |
| 4,845,420 | 7/1989 | Oshizawa et al. | 323/222 |
| 4,866,295 | 9/1989 | Leventis et al. | 307/43 |
| 4,886,952 | 12/1989 | Horiuchi | 219/10.77 |
| 4,920,309 | 4/1990 | Szepesi | 323/269 |
| 4,929,882 | 5/1990 | Szepesi | 323/222 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,950,974 | 8/1990 | Pagano | 323/222 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,070,439 | 12/1991 | Remson | 363/22 |
| 5,132,606 | 7/1992 | Herbert | 323/266 |
| 5,138,249 | 8/1992 | Capel | 323/283 |
| 5,146,399 | 9/1992 | Gucyski | 363/89 |
| 5,157,269 | 10/1992 | Jordan et al. | 307/59 |
| 5,161,097 | 11/1992 | Ikeda | 363/124 |
| 5,272,613 | 12/1993 | Büthker | 363/21 |
| 5,278,490 | 1/1994 | Smedley | 323/284 |
| 5,287,261 | 2/1994 | Ehsani | 363/124 |
| 5,349,284 | 9/1994 | Whittle | 323/207 |
| 5,359,281 | 10/1994 | Barrow et al. | 323/284 |
| 5,397,976 | 3/1995 | Madden et al. | 323/222 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,436,550 | 7/1995 | Arakawa | 323/222 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,477,132 | 12/1995 | Canter et al. | 323/282 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,570,276 | 10/1996 | Cuk et al. | 363/16 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |
| 5,663,874 | 9/1997 | Mader et al. | 363/21 |
| 5,691,592 | 11/1997 | Gunderson et al. | 310/317 |
| 5,691,889 | 11/1997 | Bazinet et al. | 363/89 |
| 5,747,977 | 5/1998 | Hwang | 323/284 |
| 5,771,164 | 6/1998 | Murai et al. | 363/89 |
| 5,847,548 | 12/1998 | He et al. | 323/222 |
| 5,861,734 | 1/1999 | Fasullo et al. | 323/222 |

OTHER PUBLICATIONS

"Nonlinear–Carrier Control for High Power Factor Rectifiers Based On Flyback, Cuk, or Sepic Converters," R. Zane and D. Maksimovic, Applied Power Electronics Conf., pp. 814–820, 1996. No Month Provided by Applicant.

"ML4880 Portable PC/PCMCIA Power Controller (Preliminary)," Micro Linear Corporation, Oct. 1995.

"ML4863 High Efficiency Flyback Controller," Micro Linear Corporation, Feb. 1995.

"ML4863EVAL User's Guide High Efficiency Flyback Controller," Micro Linear Corporation, Feb. 1995.

"Nonlinear–Carrier Control for High Power Factor Boost Rectifiers," D. Maksimovic, Y. Jang, R. Erikson, Applied Power Electronics Conf., pp. 635–641, 1995. No Month Provided by Applicant.

"ML4823 High Frequency Power Supply Controller," Micro Linear Corporation, Dec. 1994.

"Load Share Controller, UC1907, UC2907, UC3907," Unitrode Integrated Circuits, Merrimack, NH, Nov. 1994.

"Off–Line And One–Cell IC Converters Up Efficiency," Frank Goodenough, Electronic Design, pp. 55–56, 58, 60, 62–64, Jun. 27, 1994.

"ML4863 High Efficiency Battery Pack Converter (Preliminary)," Micro Linear Corporation, Jun. 1994.

"Designing with hysteretic current–mode control," Gedaly Levin and Kieran O'Malley, Cherry Semi–Conductor Corp., EDN, pp. 95–96, 98, 100–102, Apr. 28, 1994.

"Step–Up/Step Down Converters Power Small Portable Systems," Bruce D. Moore, EDN, pp. 79–84, Feb. 3, 1994.

"ML4861 Low Voltage Boost Regulator," Micro Linear Corporation, Jun. 1993.

"11. Variable Frequency Converters," K. Kit Sum, pp. 96–97, 134–135, 1993. Month Not Provided by Appl.

"3.3V/5V/Adjustable Output, Step–Up, DC—DC Converters," Maxim Integrated Products, pp. 1–8, 1993. Month Not Provided.

"ML4821EVAL Average Current PFC Controller Evaluation Kit," Micro Linear Corporation, p. 6–127, Jul. 1992.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"Small–Signal High–Frequency Analysis Of The Free–Running Current–Mode–Controlled Converter," Richard Redl, pp. 897–906, IEEE, 1991 No Month Provided by Applicant.

"Analysis of the Flyback Converter Operating in Current–Mode Pulse–Frequency Modulation," Urs Mader and K. Kit Sum, Micro Linear Corporation, (no date).

"Low–Voltage–Input, 3V/3.3V/5V/Adjustable–Output, Step–Up DC—DC Converters," Maxim Integrated Products, pp. 4–189 to 4–191 (no date).

"LT1073 Micropower DC—DC Converter Adjustable and Fixed 5V, 12V," Linear Technology, pp. 4–174 to 4–189, 4–192, (no date).

"System–Engineered Portable Power Supplies Marry Improved Efficiency And Lower Cost," Bruce D. Moore, Maxim Integrated Products (no date).

"CD 54/74 HC 4046A Technical Data," RCA, (no date).

"Application Note 30," Linear Technology, p. AN30–42, (no date).

LOAD CURRENT SHARING AND CASCADED POWER SUPPLY MODULES

FIELD OF THE INVENTION

The present invention relates to the field of electrical power supplies. More particularly, the present invention relates to electrical power supplies having a plurality of separable power supply modules coupled together so as to jointly share responsibility for supplying current to a load.

BACKGROUND OF THE INVENTION

Under certain circumstances, it can be desirable to provide a plurality of power supplies connected in parallel so as to have a common output node for supplying power to a load. If each power supply were to operate independently, however, a disproportionate amount of the current required by the load would tend to be supplied by only one power supply while the other power supplies would supply significantly less current.

Load sharing is a technique which distributes responsibility for supplying current to a load among two or more power supplies having a common output node. Thus, load sharing introduces a degree of interdependency among parallel power supplies. U.S. Pat. No. 5,157,269, issued to Jordan et al., discloses a load current sharing circuit that allows multiple power supplies to be connected in parallel such that each power supply delivers only its proportionate share of the load current. The power supply providing the highest current to the load functions as the master while all the other power supplies function as slaves. Each slave increases its share of load current so as to asymptotically approach the load current supplied by the master within a preset offset, while the load current of the master decreases. The output voltage is regulated with feedback.

This technique has a disadvantage in that when sufficient current is being supplied to the load for maintaining the required output voltage, one or more of the slaves may increase the output voltage in an attempt to match the load current supplied by the master. Thus, if the feedback loop is not properly damped, the output voltage could reach a high level. Also, if any one of the power supplies should fail such that its output current is uncontrolled in that it "runs away," this power supply would become the master and all the others would attempt to follow by providing their maximum outputs. Thus, interdependency among the power supplies introduced by the load sharing technique of U.S. Pat. No. 5,157,269, might result in excessive current.

U.S. Pat. No. 4,717,833 issued to Small, discloses single wire current share paralleling of power supplies where each of a plurality of power supplies produces an output current which is controlled to conform to an average of the currents produced by all the power supplies. This technique has a disadvantage in that if one or more of the power supplies should fail such that it provides more or less than its share of the load current, then the average of the currents changes which could adversely affect the load.

Therefore, what is needed is a load sharing technique which distributes responsibility for supplying current to a load among two or more power supplies having a common output node and which does not suffer from disadvantages of the prior art.

SUMMARY OF THE INVENTION

The invention is a load sharing technique for a modular power supply which distributes responsibility for supplying current to a load among two or more power supply modules having a common output node. One of the power supply modules which supplies the lowest level of current to the load functions as the master while the remaining power supply modules each function as a slave. A common load share bus which interconnects all the power supply modules is driven by the master with a signal representative of the level of current supplied by the master. Each power supply module includes a voltage feedback loop which monitors the voltage level of the common node and a current feedback loop which monitors the common load share bus. These two feedback loops included in each power supply module control the output level of the power supply. Each slave module attempts to reduce its output current to a level which is a predetermined offset above the level of current supplied by the master while a regulated voltage is maintained at the common output node.

Any one of the modules can become the master, though once the power supply is operating, the predetermined offset generally prevents the roles from changing. Should one of the power supply modules fail such that its output current is uncontrolled, however, this power supply module will not be the master. For example, if the master should fail such that its output current is uncontrolled, it changes roles to become a slave while a previous slave having the lowest output current assumes the role of master. Alternately, if a slave should fail in such a manner, the failing slave remains a slave. Therefore, under such a failure condition, the master controls the remaining slaves to reduce their output, thereby compensating for the failed power supply module. It is believed that this arrangement provides a safety advantage over prior techniques.

According to another aspect of the present invention, a power supply module can be inserted when there are already other power supply modules present and actively supplying power to the load. A hot swap circuit included in each power supply module ensures that the newly inserted module cannot drive the common load share bus until after its output current reaches a level that is higher that the output level of the master. Accordingly, such a newly inserted power supply module becomes a slave.

According to yet another aspect of the present invention, rather than providing a common load share bus, a plurality of power supply modules are cascaded in a line, a loop or a tree. In the line arrangement, a first one of the power supply modules in the line is preconditioned to function only as a master, while one or more intermediate modules in the line function both as a master and a slave; a last module in the line functions only as a slave. In an exemplary power supply having three power supply modules in a line arrangement, the first power supply module functions as a master relative a second power supply module, while the second power supply module functions as a slave relative the first power supply module and as a master relative a third power supply module. The third power supply module functions only as a slave.

The loop arrangement differs from the line arrangement in that the last power supply module also functions as a master relative the first power supply module. Thus, in the loop arrangement, none of the modules is preconditioned as master and each module functions as a master relative an adjacent neighbor and also functions as a slave relative another adjacent neighbor. The tree arrangement differs from the line arrangement in that two or more modules function as slaves relative a same module which is preconditioned as master. A power supply can include modules arranged in combinations of the line, loop and tree arrangements. Each module in these described arrangements, however, supplies power to a load via a common output terminal.

DETAILED DESCRIPTION OF A PREFERRED EMBODIMENT

Figure 1:
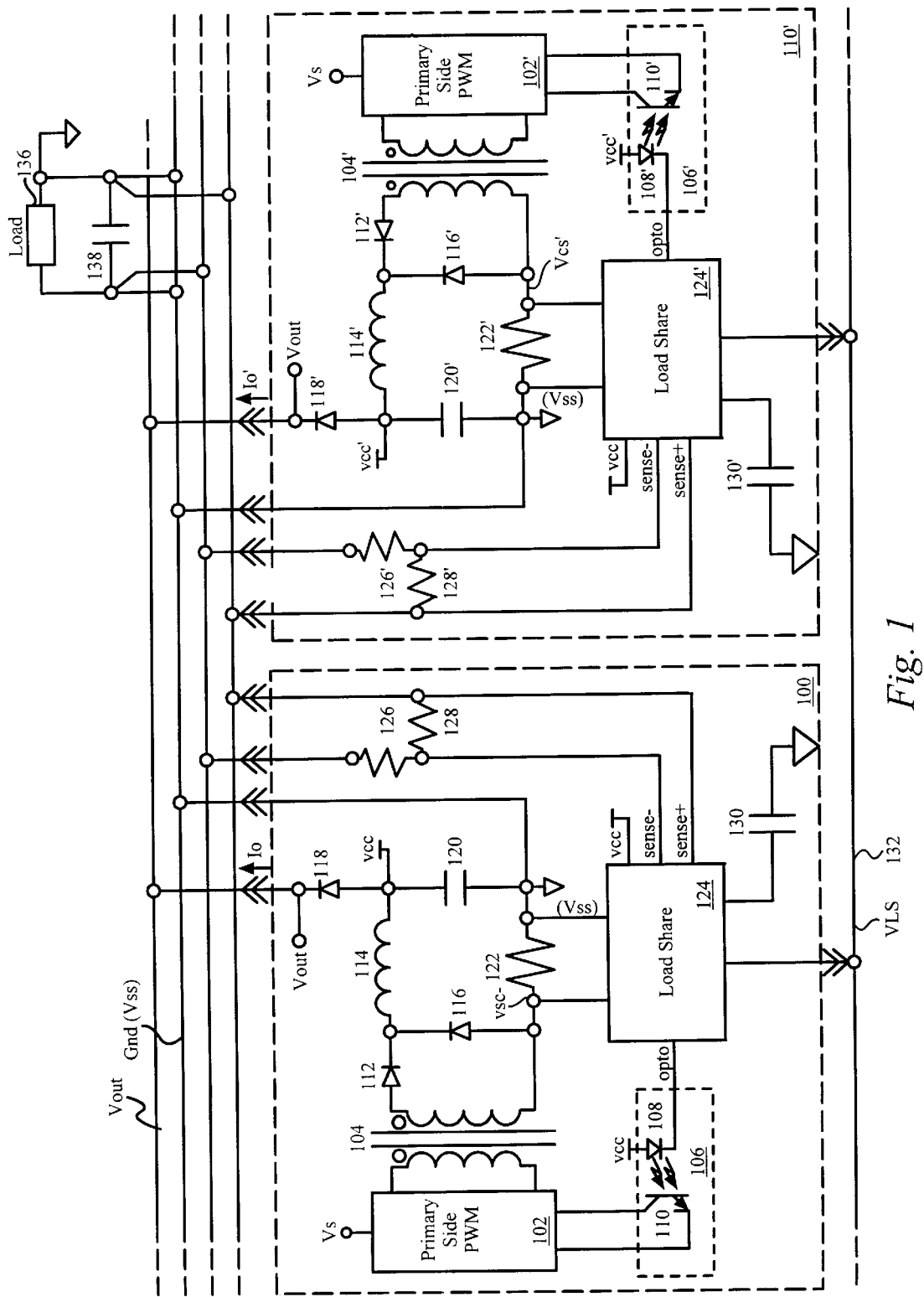
FIG. 1 illustrates a block schematic diagram of a modular load sharing power supply circuit according to the present invention.

FIG. 1 illustrates a block schematic diagram of a modular load sharing power supply circuit according to the present invention. A pair of power supply modules 100 and 100' have a common output node $V_{OUT}$. A first power supply module 100 includes a pulse-width modulation circuit 102 which is coupled to receive power from an unregulated power supply $V_S$. The pulse-width modulation circuit 102 provides current pulses to a primary winding of a transformer 104. The duty cycle and duration of the current pulses provided to the primary winding of the transformer 104 are controlled according to a feedback signal provided to the pulse-width modulation circuit 102 via an opto-isolator 106. The opto-isolator 106 includes a light emitting diode 108 and a photo-resistor 110. An anode of the light emitting diode 108 is coupled to a node $V_{CC}$. The photo-resistor 110 provides the feedback signal to the pulse-width modulation circuit 102 based upon a control signal applied to the cathode of the diode 108.

A first terminal of a secondary winding of the transformer 104 is coupled to an anode of a diode 112. A cathode of the diode 112 is coupled to a first terminal of an inductor 114 and to a cathode of a diode 116. A second terminal of the inductor 114 is coupled to an anode of a diode 118, to the node $V_{CC}$ and to a first terminal of a capacitor 120. A second terminal of the capacitor 120 is coupled to a ground node. A second terminal of the secondary winding of the transformer 104 is coupled to a cathode of the diode 116, to a first terminal of a current sensing resistor 122 and to a CS– (current sense) terminal of a load share control circuit 124. A second terminal of the current sensing resistor 122 is coupled to the ground node $V_{SS}$.

The current pulses in the primary winding of the transformer 104 induce a current in the secondary winding of the transformer 104. The induced current in the secondary winding is rectified by the diodes 112, 116 and is filtered by the inductor 114 and capacitor 120. Therefore, a voltage is generated at the node $V_{CC}$ which is related to the duty cycle of the pulses provided to the primary winding of the transformer 104 by the pulse-width modulation circuit 102. A cathode of the diode 118 is coupled to a node $V_{OUT}$. Therefore, the voltage at the node $V_{OUT}$ is maintained at a level that is at least as high as one diode voltage drop lower than the voltage formed at the node $V_{CC}$.

A first terminal of a resistor 126 is coupled to the node $V_{OUT}$. A second terminal of the resistor 126 is coupled to a first terminal of a resistor 128 and to a SENSE– terminal of the load share control circuit 124. A second terminal of the resistor 128 is coupled to the ground node $V_{SS}$ and to a SENSE+ terminal of the load share control circuit 124. An OPTO terminal of the load share control circuit 124 is coupled to a cathode of the diode 108. A GM COMP terminal of the load share control circuit 124 is coupled to a first terminal of a compensation capacitor 130. A second terminal of the compensation capacitor 130 is coupled to the ground node. This compensation capacitor 130 serves to limit feedback bandwidth for a current control feedback loop of the load share control circuit 124. An LS_BUS (load share bus) terminal of the load share control circuit 124 is coupled to a load share bus 132. A $V_{CC}$ terminal of the load share control circuit 124 is coupled to the node $V_{CC}$. A ground terminal $V_{SS}$ of the load share control circuit 124 is coupled to the ground node.

The elements 102–130 comprise the first power supply module 100 of the power supply circuit according to the present invention. As illustrated in FIG. 1, a second power supply module 100' includes elements 102'–130'. The power supply module 100' can be identical to the power supply module 100. Thus, elements of the power supply module 100' having a one-to-one functional correspondence with elements of the power supply module 100 are given the same reference designation primed. Each power supply module 100, 100' is coupled to the ground node $V_{SS}$, to the common node $V_{OUT}$ and to the load share bus 132. A first terminal of a load 136 and a first terminal of a capacitor 138 are each coupled to the common node $V_{OUT}$. A second terminal of the load 136 and a second terminal of the capacitor 138 are each coupled to the ground node $V_{SS}$.

In the preferred embodiment, the load share control circuit 124 monitors the voltage across the load 136 via the SENSE– and SENSE+ terminals of the load share control circuit 124. The resistors 126 and 128 form a resistive divider which provides a voltage across the SENSE– and SENSE+ terminals that is proportional to the voltage across the load 136. In addition, the load share control circuit 124 monitors a current $I_O$ supplied to the load 136 by the power supply module 100. For this purpose, the current sensing resistor 122 converts the current $I_O$ into a voltage $V_{CS-}$ at the CS– terminal of the load share control circuit 124. The load share control circuit 124 also monitors a control voltage $V_{LS}$ on the load share bus 132 via the LS_BUS terminal of the load share control circuit 124. Based upon these monitored signals, the load share control circuit 124 forms a control signal which is applied to the cathode of the diode 108 via the OPTO terminal of the load share control circuit 124. This control signal provided via the OPTO terminal controls the duty-cycle of the current pulses generated by the pulse width modulation circuit 102.

The load share control circuit 124' operates in a similar fashion. Thus, the load share control circuit 124' monitors the voltage across the load 136 via a resistive divider 126', 128' and via SENSE− and SENSE+ terminals of the load share control circuit 124'. In addition, a sensing resistor 122' forms a voltage signal $V_{CS-}'$ which is proportional to a current $I_O'$ supplied to the load 136 by the power supply module 100'. Based upon the voltage across the load 136 and the voltage signal $V_{CS-}'$, the load share control circuit 124' controls a pulse-width modulation circuit 102' via an opto-isolator 106'.

Each of the two power supply modules 100, 100' share in providing power to the lead 136. Though two power supply modules 100, 100' are illustrated in FIG. 1, after reading this disclosure, it will become apparent to one of ordinary skill in the art that one or more additional power supply modules can be added by appropriately coupling each additional power supply module to the ground terminal $V_{SS}$, to the terminal $V_{OUT}$ and to the load share bus 132. It will also be apparent that one of the power supply modules 100 or 100' can be removed such that power is supplied to the load 136 by the single remaining power supply module.

In a power supply having two or more power supply modules, one of the power supply modules is the master of the others, while each other power supply module is a slave. The master drives the load share bus 132 while each of the slaves monitors the load share bus 132. In the preferred embodiment, the one power supply module which provides the least current to the load 136 functions as the master, though any module can become the master. Thus, in the preferred embodiment, the modules are of like construction and none is preconfigured as the master. The master drives the load share bus 132 to a control voltage $V_{LS}$ which is representative of the amount of current that the master is providing to the load 136. For example, assuming that the power supply module 100 is the master, the voltage level of the load share bus 132 is representative of the current through the current sense resistor 122, and thus, the voltage level of the of the load share bus 132 is representative of a voltage $V_{CS-}$ formed at the CS− terminal of the load share control circuit 124.

The remaining power supply modules, which are functioning as the slaves, monitor the voltage $V_{LS}$ on the load share bus 132 and, in response, attempt to provide a level of current to the load that is nearly equal or proportionate to the level of current being supplied by the master (utilizing feedback, as described herein). For example, assume that the power supply module 100' is a slave, the module 100 is the master, and the resistor 122' is the same value as the resistor 122. In such case, the power supply module 100' attempts to provide a nearly equal amount of current to the load 136 as is supplied by the module 100. In the preferred embodiment, each slave is conditioned to provide slightly more current to the load than the master so as to prevent the master/slave roles from changing in absence of a failure condition. Thus, in the example where the module 100 is the master and the module 100' is slave, the module 100' remains a slave in absence of a failure condition.

As another example, assume that the power supply module 100' has a rated capacity that is one-third the rated capacity of the power supply module 100. In such case, the current sensing resistor 122' is preferably three times the value of the current sensing resistor 122. Either the power supply module 100 or the power supply module 100' can be the master and each will attempt to provide an appropriate proportion of the total amount of current through the load 136 according to the respective values of their current sensing resistors 122, 122'. It will be apparent, therefore, that the relationships among rated power of the power supply modules and the values of the current sensing resistors are preferably inversely proportional.

Figure 2:
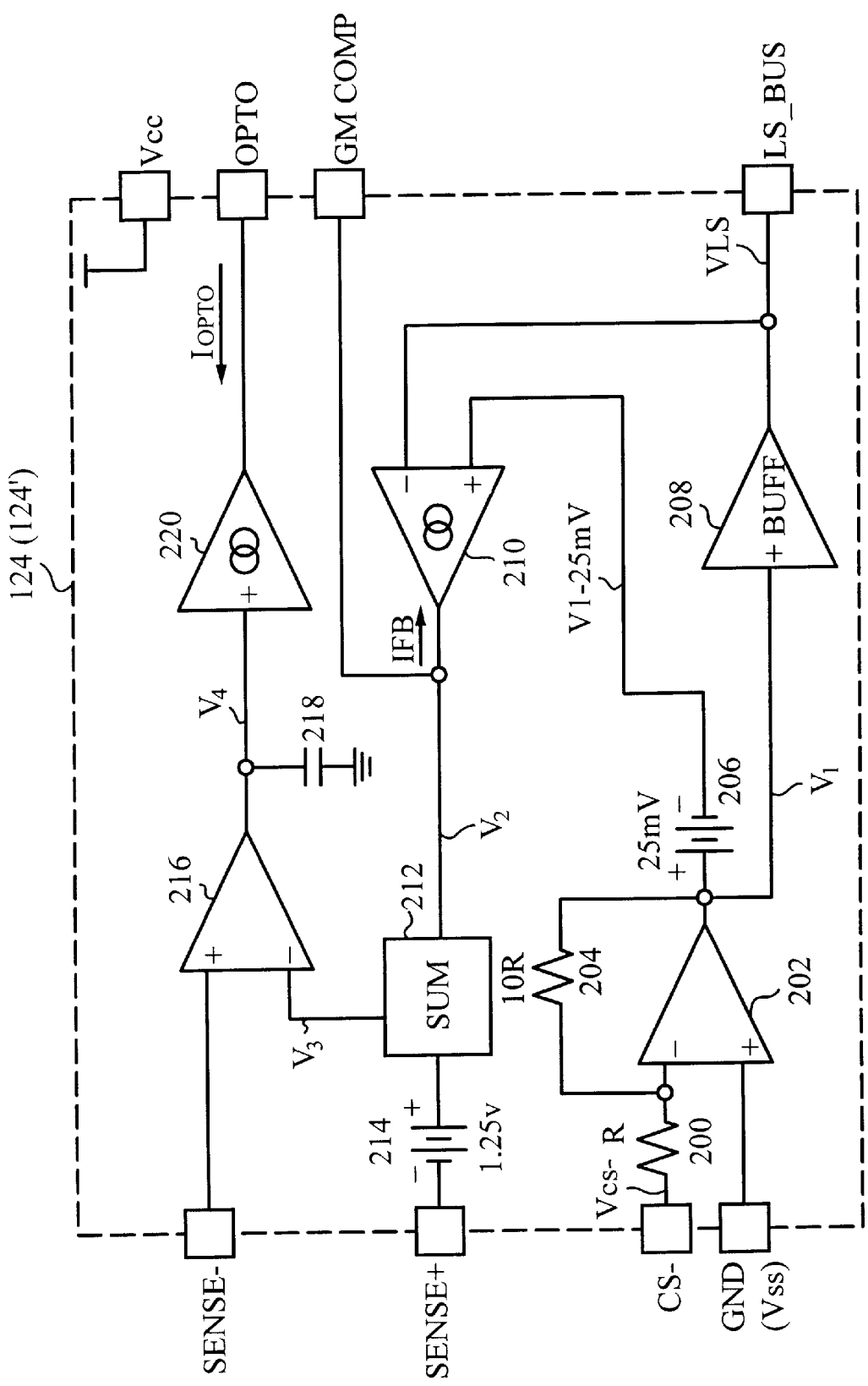
FIG. 2 illustrates a block schematic diagram of a load share control circuit illustrated in FIG. 1.

FIG. 2 illustrates a block schematic diagram of the load share control circuit 124 illustrated in FIG. 1. The load share control circuit 124' illustrated in FIG. 1 can be identical to the load share control circuit 124 illustrated in FIG. 2. The CS− terminal is coupled to a first terminal of a resistor 200. A second terminal of the resistor 200 is coupled to an inverting input of an amplifier 202 and to a first terminal of a resistor 204. A non-inverting input of the amplifier 202 is coupled to the ground terminal $V_{SS}$. A second terminal of the resistor 204 is coupled to the output of the amplifier 202, to a positive terminal of an offset circuit 206 and to an input of a buffer 208. In the preferred embodiment, the value of the resistor 204 is greater than the value of the resistor 202 by a factor of ten which results in the amplifier 202 providing a gain of ten at its output. It will be apparent, however, that another gain can be selected for the amplifier 202.

The voltage $V_{CS-}$ present at the CS− terminal of the load share control circuit 124 is representative of the current $I_O$ supplied to the load 136 (FIG. 1) by the power supply module 100. This current $I_O$ is drawn from the ground node, through the sensing resistor 122 (FIG. 1) and is supplied to the load 136 via the diode 118 (FIG. 1). Therefore, the polarity of the voltage $V_{CS-}$ applied to the CS− terminal is negative. The amplifier 202 and resistors 200, 204 are configured to amplify this voltage by a factor of ten and to invert its polarity. Therefore, a voltage $V_1$ provided to the input of the buffer 208 can be given by: $V_1 = (-10)(V_{CS-})$.

A negative terminal of the offset circuit 206 is coupled to a non-inverting input of a transconductance amplifier 210. In the preferred embodiment, the offset circuit 206 provides a voltage offset of 25 mV. It will be apparent, however, that another voltage offset level can be selected. An output of the buffer 208 is coupled to the LS_BUS terminal and to an inverting input of the transconductance amplifier 210.

If the load share control circuit 124 illustrated in FIG. 2 is a master, then the buffer 208 drives the load share bus 132 to a voltage $V_{LS}$ that is substantially equal to the voltage $V_1$ at the input of the buffer 208. Otherwise, if the load share control circuit 124 is a slave, then the load share bus 132 is driven by another one of the load share circuits (the master) to a voltage $V_{LS}$ that is lower than the voltage $V_1$ and, thus, the buffer 208 of the slave prevents the voltage $V_1$ of the slave from driving the load share bus 132.

Figure 3:
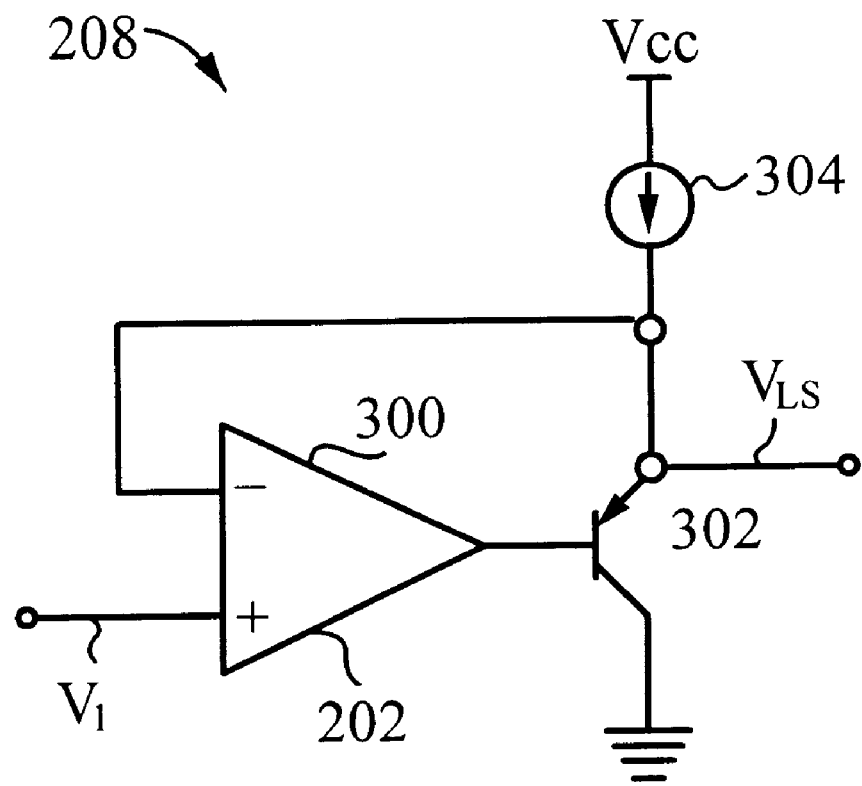
FIG. 3 illustrates a block schematic diagram of a buffer circuit illustrated in FIG. 2.

FIG. 3 illustrates a block schematic diagram of the buffer 208 illustrated in FIG. 2. The input terminal of the buffer 208 which receives the voltage $V_1$ is coupled to a non-inverting input of an amplifier 300. An output of the amplifier 300 is coupled to a base of a pnp bipolar transistor 302. A collector of the transistor 302 is coupled to the ground node $V_{SS}$. An emitter of the transistor 302 is coupled to an inverting input of the amplifier 300 and to a first terminal of a current source 304. A second terminal of the current source 304 is coupled to the node $V_{CC}$. The voltage $V_{LS}$ is present at the emitter of the transistor 302.

When the load share control circuit 124 which includes the buffer 208 illustrated in FIG. 3 is the master, the transistor 302 is biased on such that the voltage $V_{LS}$ is substantially equal to the voltage $V_1$. Under such conditions, the current source 304 provides a bias current to the transistor 302. When the load share control circuit 124 which includes the buffer 208 is a slave, however, the voltage $V_{LS}$ is allowed to fall below the voltage $V_1$ and the transistor 304 is biased off. Under such conditions, the bias current provided by the current source 304 is provided to the load share bus 132 (FIG. 1) from which it is absorbed by the master. Thus, the bias condition of the transistor 302 is indicative of whether the power supply module 124 is master or a slave.

Returning to FIG. 2, an output of the transconductance amplifier 210 is coupled to the terminal GM COMP and to a first input terminal of a summing circuit 212. A difference between the voltage $V_1$ at the non-inverting input of the amplifier 208 (less an offset of 25 mV) and the voltage $V_{LS}$ on the load share bus 132 is applied across the inputs of the transconductance amplifier 210. The output of the transconductance amplifier 212 is an error signal $I_{FB}$ that is representative of a difference between a current provided to the load 136 by the master and a current supplied to the load 136 by the power supply module which includes the load share control circuit 124 illustrated in FIG. 2. The error signal $I_{FB}$ forms a voltage $V_2$ across the capacitor 130 (FIG. 1). Assuming the load share control circuit 124 illustrated in FIG. 2 is master, then the voltage $V_2$ reaches a steady-state level. This steady-state level effectively disables the feedback loop which controls the proportion of output current $I_O$ supplied to the load 136 by the master and allows the voltage at the common output node $V_{OUT}$ to be regulated by the master in a feedback loop.

Assuming, however, that the load share control circuit 124 illustrated in FIG. 2 is a slave, the current $I_{FB}$ will reflect a difference between the current 10 supplied to the load 136 by the power supply module 100 which includes the load share control circuit 124 and the current supplied to the load by the master. The current $I_{FB}$ controls the output current of the slave such that the slave attempts to nearly match the level of current supplied by the master.

The 25 mV offset provided by the offset circuit 206 generally prevents the level of current provided to the load 136 by the slave from falling below the level of current supplied by the master. Thus, in the preferred embodiment, once one of the power supply modules becomes the master, it remains the master in absence of a failure condition. If the master should fail such that the current supplied to the load 136 (FIG. 1) by the master is uncontrolled, one of the slaves assumes the role of master. In response, the new master reduces the amount of current supplied by itself and all the remaining power supply modules. This response is in contrast to prior techniques where such a "run away" failure mode occurring in any power supply results in the failed power supply becoming the master which would then increase the current supplied by all the slaves as they attempt to match the uncontrolled output current of the master. For this reason, it is believed that the present invention has an advantage in comparison to prior techniques.

The SENSE− terminal of the load share control circuit 124 is coupled to a negative terminal of an offset circuit 214. A positive terminal of the offset circuit 214 is coupled to a second input terminal of the summing circuit 212. In the preferred embodiment, the offset circuit 214 provides a voltage offset of 1.25 volts. An output terminal of the summing circuit 212 is coupled to an inverting input terminal of an amplifier 216. The SENSE+ terminal of the load share control circuit 124 is coupled to a non-inverting input terminal of the amplifier 216. An output of the amplifier 216 is coupled to a first terminal of a capacitor 218 and to an input of a transconductance amplifier 220 (a negative voltage applied to the input of the transconductance amplifier 220 results in a current into the output of the transconductance amplifier 220). The output of the transconductance amplifier 220 forms the control signal $I_{OPTO}$ which is coupled to the OPTO terminal of the load share control circuit 124. As mentioned, the control signal $I_{OPTO}$ controls the duty cycle of pulse-width modulation circuit 102 (FIG. 1).

Recall that the SENSE− terminal is coupled to the ground node $V_{SS}$, while the SENSE+ terminal is representative of the voltage level applied to the load 136 (FIG. 1) at the output node $V_{OUT}$. Thus, assuming equilibrium is reached, a voltage $V_3$ applied to the non-inverting input of the amplifier 216 is representative of a desired level of the output voltage at the node $V_{OUT}$. The level of $V_3$ is influenced, however, by the actual voltage across the load 136, the values of the resistors 126, 128 and the voltage level provided by the offset circuit 214. In addition, the current $I_{FB}$ draws charge from the capacitor 130 (FIG. 1) and affects a voltage applied to the first input of the summing circuit 212. Thus, the voltage $V_3$ applied to the non-inverting input of the amplifier 212 deviates from its steady-state value according to changes in the current $I_{FB}$ and according to a difference between the desired output voltage and the actual voltage level applied to the load 136.

A voltage level $V_4$ formed at the output of the amplifier 216 is representative of a difference between the voltage level at the output node $V_{OUT}$ and a desired level for this voltage. In addition, the voltage level $V_4$ is also representative of a difference between the current $I_0$ provided to the load 136 by the power supply module 100 which includes the load share control circuit 124 and the current provided to the load by the master. The voltage level $V_4$ controls a level of the current $I_{OPTO}$ drawn through the light emitting diode 108. The level of the current $I_{OPTO}$ controls the duty cycle of the pulse-width modulation circuit 102. Therefore, the load share control circuit 124 implements two feedback loops. The first feedback loop controls the voltage applied to the load 136 (FIG. 1) while the second feedback loop controls the proportion of current supplied to the load 136 by the power supply module 100. The capacitor 218 serves to limit feedback bandwidth for both loops.

In the preferred embodiment, the load share control circuit 124 is implemented as an integrated circuit chip having eight pins. An integrated circuit chip which embodies the load share control circuit 124 is anticipated to be available under part number ML4808 from Micro Linear Corporation, located at 2092 Concourse Drive, San Jose, Calif. 95131.

Figure 4:
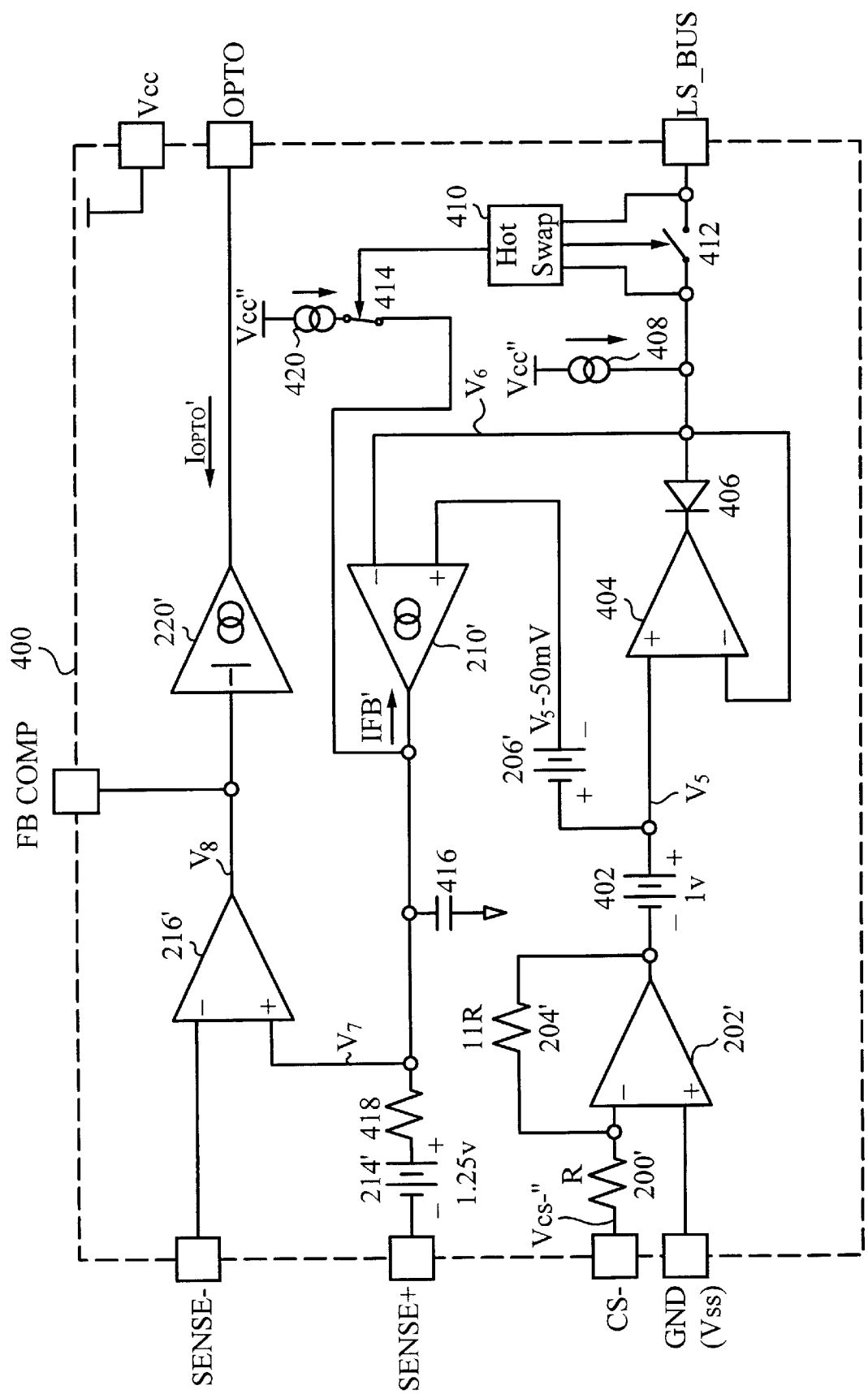
FIG. 4 illustrates a block schematic diagram of a first alternate embodiment of a load share control circuit according to the present invention.

FIG. 4 illustrates a block schematic diagram of a first alternate embodiment of a load share control circuit 400 according to the present invention. Elements of the load share control circuit 400 illustrated in FIG. 4 having a one-to-one functional correspondence with elements of the load share control circuit illustrated in FIG. 2 are given the same reference designation primed. Among the differences between the load share control circuit illustrated in FIG. 4 and the load share control circuit 124 illustrated in FIG. 2 are: an offset circuit 402 is added to FIG. 4; the buffer 208 of FIG. 2 is replaced with an amplifier 404 and a diode 406 in FIG. 4; the summing circuit 212 of FIG. 2 is omitted from FIG. 4; a capacitor 130 which is external to the load share control circuit 124 of FIG. 2 is moved internally as capacitor 416 in FIG. 4, while the terminal GM COMP of FIG. 2 is omitted from FIG. 4; and a capacitor 218 which is internal to the load share control circuit 124 illustrated in FIG. 2 is moved externally as capacitor 502 illustrated in FIG. 5, while the terminal FB COMP is added to FIG. 4. In addition, the load share control circuit 400 illustrated in FIG. 4 includes a hot swap circuit 410 and associated elements 412, 414, 420. It will be apparent after reading this disclosure, however, that a hot swap circuit 410 and the associated other elements 412, 414, 420 can be included in the load share control circuit 124 illustrated in FIG. 2.

Figure 5:
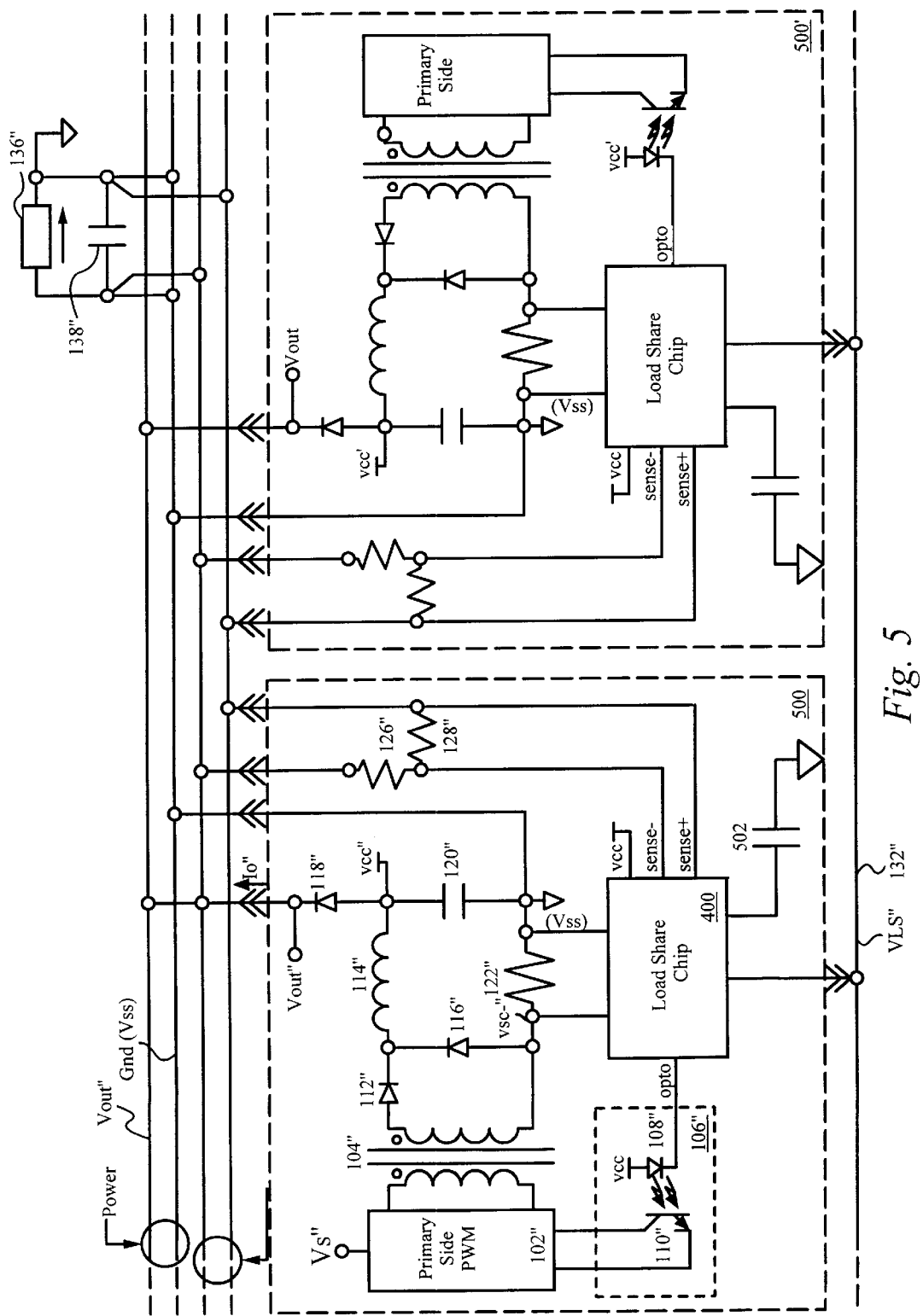
FIG. 5 illustrates a block schematic diagram of a modular load sharing power supply circuit utilizing the load share control circuit illustrated in FIG. 4

FIG. 5 illustrates a block schematic diagram of a modular load sharing power supply circuit utilizing the load share control circuit 400 illustrated in FIG. 4. Elements of the power supply circuit illustrated in FIG. 5 having a one-to-one functional correspondence with elements of the power supply circuit illustrated in FIG. 1 are given the same reference designation twice primed. A second load share control circuit 400' illustrated in FIG. 5 can be identical to the load share control circuit 400. A primary difference between the power supply circuit illustrated in FIG. 5 and the power supply circuit illustrated in FIG. 1 is that the GM COMP terminal and capacitor 130 illustrated in FIG. 1 are replaced with a FB COMP terminal and capacitor 502.

Referring to FIG. 4, the CS– terminal of the load share control circuit 400 is coupled to a first terminal of a resistor 200'. A second terminal of the resistor 200' is coupled to an inverting input of an amplifier 202' and to a first terminal of a resistor 204'. A non-inverting input of the amplifier 202' is coupled to the ground terminal $V_{SS}$". A second terminal of the resistor 204' is coupled to the output of the amplifier 202' and to a negative terminal of the offset circuit 402'. A positive terminal of the offset circuit 402 is coupled to a non-inverting input of the amplifier 404 and to a positive terminal of an offset circuit 206'. In the preferred embodiment, the value of the resistor 204' is greater than the value of the resistor 202' by a factor of eleven, although it will be apparent that another value can be selected.

The voltage $V_{CS-}$" at the CS– terminal of the load share control circuit 400 is representative of a current supplied to a load 136" (FIG. 5) by the power supply module 400. The polarity of the voltage $V_{CS-}$" applied to the CS– terminal is negative because it is preferably formed by drawing a current from the ground node $V_{SS}$" through a sensing resistor 122" (FIG. 5). The amplifier 202' and resistors 200' and 204' are configured to amplify this voltage by a factor of eleven and to invert its polarity. In addition, the offset circuit 206' preferably provides a voltage offset of one volt. Therefore, a voltage $V_5$ provided to the non-inverting input of the amplifier 404 can be given by $V_5=[1+(-11)(V_{CS-}")]$.

A negative terminal of the offset circuit 206' is coupled to a non-inverting input of a transconductance amplifier 210'. In the preferred embodiment, the offset circuit 206' provides a voltage offset of 50 mV. An output of the amplifier 404 is coupled to a cathode of a diode 406. An anode of the diode 406 is coupled to an inverting input of the amplifier 404, to an inverting input of the transconductance amplifier 210', to a first terminal of a current source 408, to a first sense terminal of a hot swap circuit 410 and to a first terminal of a switch 412.

A second terminal of the current source 408 is coupled to the node $V_{CC}$". A second sense terminal of the hot swap circuit 410 is coupled to the LS_BUS terminal and to a second terminal of the switch 412. A first control terminal of the hot swap circuit 410 is coupled to control the state of the switch 412 . A second control terminal of the hot swap circuit 410 is coupled to control the state of a switch 414.

When the switch 412 is closed, as during normal operation, a voltage $V_6$ at the anode of the diode 406 is equal to the voltage $V_{LS}$" on a load share bus 132" (FIG. 5). If the load share control circuit 400 illustrated in FIG. 4 is a master, then the diode 406 is forward biased and the amplifier 404 drives the load share bus 132" to a voltage $V_{LS}$" that is substantially equal to the voltage $V_5$ at the non-inverting input of the amplifier 404. Otherwise, if the load share control circuit 400 illustrated in FIG. 4 is a slave, then the load share bus 132" is driven by another one of the load share circuits (the master) to a voltage $V_{LS}$" that is lower than the voltage $V_5$ and, thus, the diode 406 is reverse biased, which prevents the slave from driving the load share bus 132". Thus, the bias condition of the diode 406 is indicative of whether the power supply module is the master or a slave.

The offset circuit 402 ensures that the voltage $V_5$ is at least one volt even if the output current $I_O$" (FIG. 5) of the master is zero or near zero. Thus, the load share bus 132" (FIG. 5) is driven to a minimum level of one volt above the ground level, which is generally a sufficient voltage drop to ensure that the diode 406 of the master is forward biased. The current source 408 provides a current for biasing the diode 406 of the master. If the power supply module is a slave such that the diode 406 is reverse biased, current from the current source 408 is provided to the load share bus 132" (FIG. 5) from which it is absorbed by the master.

An output of the transconductance amplifier 210' is coupled to a first terminal of a switch 414, to a first terminal of a capacitor 416, to a first terminal of a resistor 418 and to a non-inverting input of an amplifier 216'. A second terminal of the switch 414 is coupled to a first terminal of a current source 420. A second terminal of the current source 420 coupled to the node $V_{CC}$. A second terminal of the capacitor 416 is coupled to the ground node.

A difference between the voltage $V_5$ at the non-inverting input of the amplifier 404 (less an offset of 50 mV) and the voltage $V_{LS}$" (obtained via the switch 412) on the load share bus 132" is applied across the inputs of the transconductance amplifier 210'. The output of the transconductance amplifier 210' is an error signal $I_{FB}$' that is representative of a difference between a current provided to the load 136" by the master and a current supplied to the load 136" by the power supply module which includes the load share control circuit 400 illustrated in FIG. 4. The current signal $I_{FB}$' forms a voltage $V_7$ across the capacitor 416. Thus, assuming the load share control circuit 400 illustrated in FIG. 4 is master, then the voltage $V_7$ reaches a steady-state level. This steady-state level effectively disables the feedback loop which controls the proportion of output current $I_O$" supplied to the load 136" by the master and allows the voltage at the common output node $V_{OUT}$" to be regulated by the master in a feedback loop.

Assuming, however, that the load share control circuit 400 illustrated in FIG. 2 is a slave, the current $I_{FB}$' will reflect a difference between the current $I_O$" supplied to the load 136" by the power supply module 500 (FIG. 5) which includes the load share control circuit 400 and the current supplied to the load by the master. The current $I_{FB}$" controls the output current of the slave such that the slave attempts to nearly match the level of current supplied by the master.

The 50 mV offset provided by the offset circuit 206' generally prevents the level of current provided by the slave from falling below the level of current supplied by the master. Thus, in the preferred embodiment, once one of the power supply modules becomes the master, it remains the master in absence of a failure condition. If the master should fail such that the current supplied to the load 136" (FIG. 5) by the master is uncontrolled, one of the slaves assumes the role of master. In response, the new master reduces the amount of current supplied by itself and all the remaining power supply modules.

A second terminal of the resistor 418 is coupled to a positive terminal of an offset circuit 214'. A negative terminal of the offset circuit 214' is coupled to the SENSE– terminal of the load share control circuit 400. In the preferred embodiment, the offset circuit 214' provides a voltage offset of 1.25 volts. The SENSE+ terminal of the load share control circuit 400 is coupled to an inverting terminal of the amplifier 216'. An output of the amplifier 216' is coupled to the FB COMP terminal of the load share control circuit 400 and to an input of a transconductance amplifier 220' (a positive voltage applied to the input of the transconductance amplifier 220' results in a current into the output of the transconductance amplifier 220'). The output of the transconductance amplifier 220' forms the control signal $I_{OPTO}'$ which is coupled to the OPTO terminal of the load share control circuit 400. The control signal $I_{OPTO}'$ controls the duty cycle of pulse-width modulation circuit 102" (FIG. 5).

The SENSE– terminal is coupled to the ground node, while the SENSE+ terminal is representative of the voltage level applied to the load 136" (FIG. 5) at the output node $V_{OUT}"$. Thus, assuming equilibrium is reached, value of a voltage $V_7$ applied to the non-inverting input of the amplifier 216' is representative of a desired value of the output voltage at the node $V_{OUT}"$. The level of $V_7$ is influenced, however, by the actual voltage across the load 136", the values of the resistors 126", 128" (FIG. 5) and the voltage level provided by the offset circuit 214'. In addition, the current $I_{FB}'$ draws charge from the capacitor 416 and affects a voltage drop across the resistor 418. Thus, the voltage $V_7$ applied to the non-inverting input of the amplifier 216' deviates from its steady-state value according to changes in the current $I_{FB}'$ and according to a difference between the desired output voltage and the actual voltage level applied to the load 136".

A voltage level $V_8$ at the output of the amplifier 228 is representative of a difference between the voltage level at the output node $V_{OUT}"$ and a desired level for this voltage. In addition, the voltage level $V_8$ is also representative of a difference between the current $I_O"$ provided to the load 136" by the power supply module 500 (FIG. 5) which includes the load share control circuit 400 and the current provided to the load by the master. The voltage level $V_8$ controls a level of the current $I_{OPTO}'$ drawn through the light emitting diode 108" (FIG. 5). The level of the current $I_{OPTO}'$ controls the duty cycle of the pulse-width modulation circuit 102" (FIG. 5). Therefore, the load share control circuit 400 implements two feedback loops. The first feedback loop controls the voltage applied to the load 136" (FIG. 5) while the second feedback loop controls the proportion of current supplied to the load 136" by the power supply module 500.

The hot swap circuit 410, switches 412, 414 and current source 420 facilitate a smooth transition for inserting a power supply module when there are already other power supply modules present and actively supplying power to the load 136" (FIG. 5). When the newly inserted power supply module is first plugged in, some amount of time is required for the newly inserted power supply module to begin supplying its share of current to the load 136". To prevent the newly inserted power supply module from pulling the voltage $V_{LS}"$ (on the load share bus 132") down while its output current $I_O"$ is ramping up, the switch 412 is held open by the hot swap circuit 410 until the voltage $V_6$ at the anode of the diode 406, as sensed by the first sensing terminal of the hot swap circuit 410, exceeds the voltage $V_{LS}"$ on the load share bus 132", as sensed by the second sensing terminal of the hot swap circuit 410. To ensure that the voltage $V_6$ at the anode of the diode 406 eventually exceeds the voltage $V_{LS}"$ of the load share bus 132", the current source 420 temporarily increases the voltage applied to the non-inverting input of the amplifier 216' thereby causing the signal $I_{OPTO}'$ to increase the output of the newly inserted power supply module. As the output current of the newly inserted power supply module ramps up, the remaining power supply modules will reduce their outputs to maintain a constant load voltage at the node $V_{OUT}"$. Once the voltage $V_6$ at the anode of the diode 406 exceeds the voltage $V_{LS}"$ on the load share bus 132", the hot swap circuit 410 closes the switch 412 and opens the switch 414.

Figure 6:
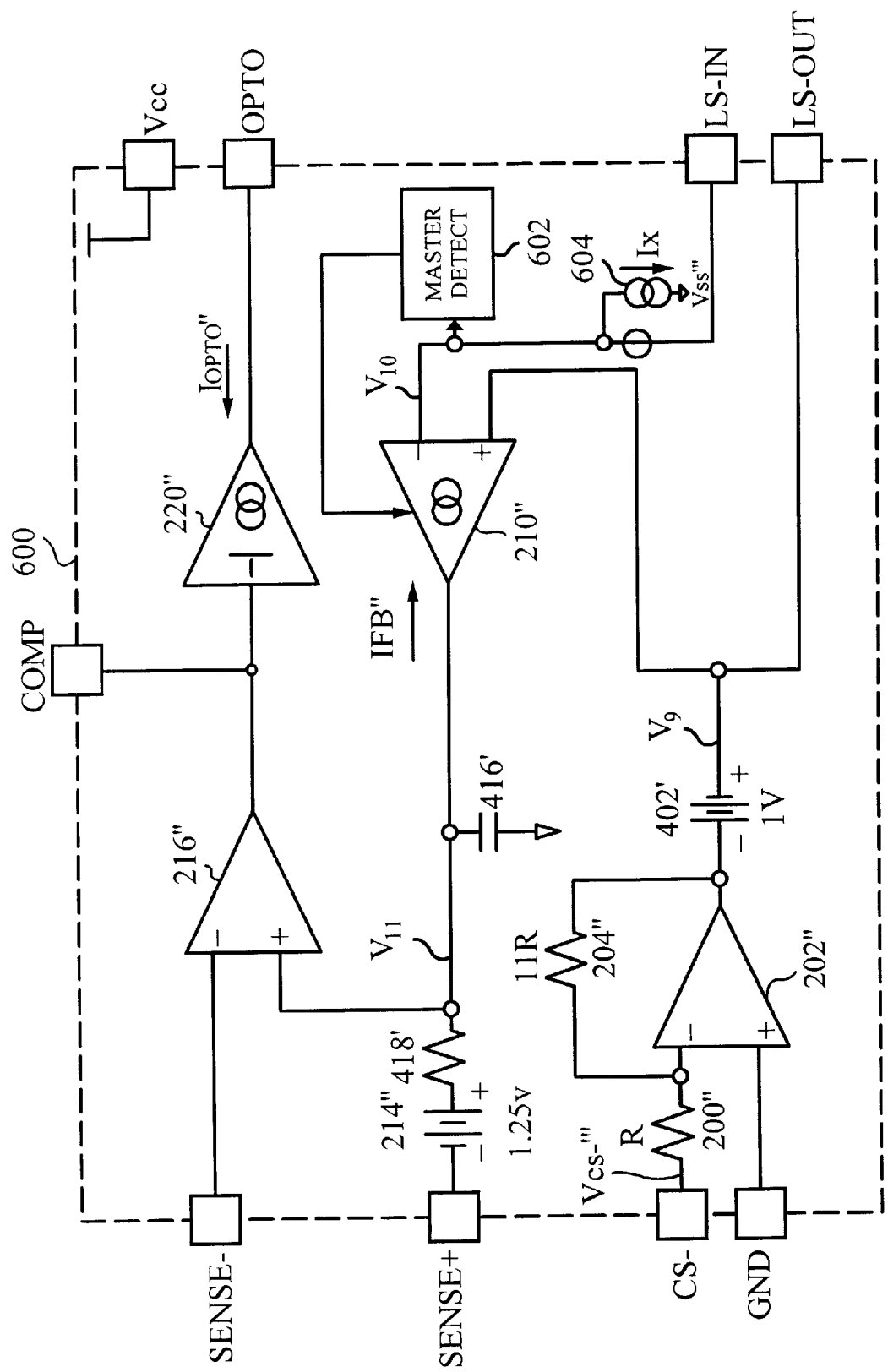
FIG. 6 illustrates a block schematic diagram of a second alternate embodiment of a load share control circuit according to the present invention.

FIG. 6 illustrates a block schematic diagram of a second alternate embodiment of a load share control circuit 600 according to the present invention. Elements of the load share control circuit 600 illustrated in FIG. 6 which have a one-to-one functional correspondence with elements of the load share control circuit 124 illustrated in FIG. 4 and the load share control circuit 400 illustrated in FIG. 6 are given the same reference designation as their counterparts additionally primed.

Figure 7:
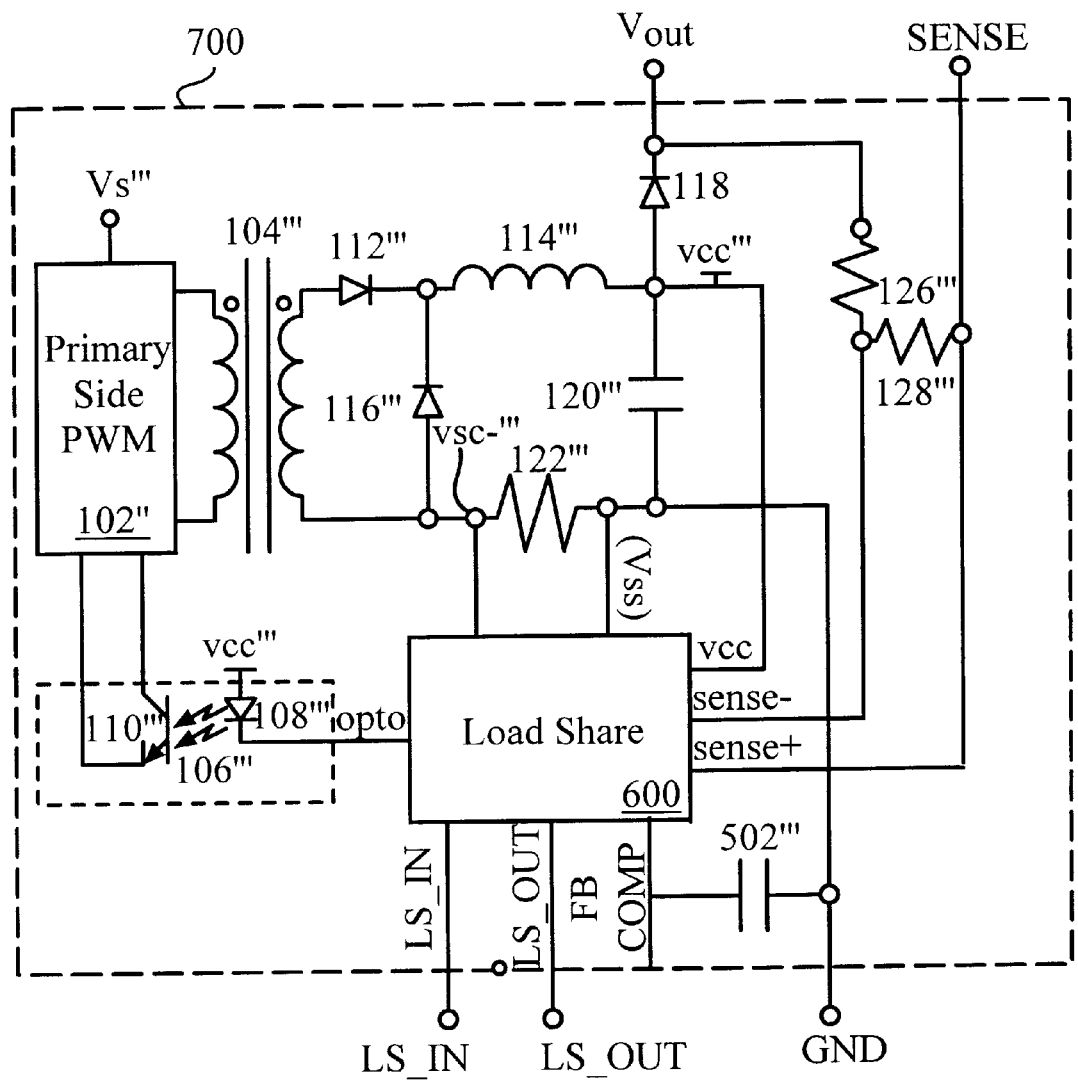
FIG. 7 illustrates a single power supply module which utilizes the load share control circuit illustrated in FIG. 6.

The load share control circuit 600 illustrated in FIG. 6 differs from the load share control circuit 400 illustrated in FIG. 4 in that the offset circuit 206' in FIG. 4 is omitted from FIG. 6 and, instead, the positive terminal of the offset circuit 402' is coupled to the non-inverting input of the transconductance amplifier 210" and to a LS_OUT terminal of the load share control circuit 600. In addition, the amplifier 404, the diode 406, the current sources 408, 420, the hot swap circuit 410, and the switches 412, 414 of FIG. 4 are omitted from FIG. 6 and, instead, a terminal LS_IN of the load share control circuit 600 is coupled to the inverting input of the transconductance amplifier 210". In addition, an input terminal of a master detect circuit 602 is coupled to the LS_IN terminal of the load share control circuit 600 and to the inverting input of the transconductance amplifier 210". An output terminal of the master detect circuit 602 is coupled to the transconductance amplifier 210" for selectively disabling the transconductance amplifier 210". Also, a first terminal of a current source 604 is coupled to the LS_IN terminal of the load share control circuit 600 and to the inverting input of the transconductance amplifier 210". A second terminal of the current source 604 is coupled to the ground node $V_{SS}'''$ (FIG. 7). Thus, in the preferred embodiment, the load share control circuit 600 is implemented as an integrated circuit chip having ten pins or fewer where only nine of the pins need be active. Ten pins are preferred over nine, however, as integrated circuit packages are normally manufactured with an even number of pins.

FIG. 7 illustrates a single power supply module 700 which utilizes the load share control circuit 606 illustrated in FIG. 6. The power supply module 700 is similar to the power supply module 500 illustrated in FIG. 5, however, because the power supply module 700 utilizes the load share control circuit 600 rather than the load share control circuit 400, the power supply module 700 of FIG. 7 has both a LS-IN terminal and a LS_OUT terminal rather than the LS_BUS terminal illustrated in FIG. 5. Elements illustrated in FIG. 7 which have a one-to-one functional correspondence with elements illustrated in FIG. 5 are given the same reference designation as their counterparts in FIG. 5 additionally primed.

Referring to FIG. 6, a voltage signal $V_{CS-}'''$ is formed at the CS– terminal of the load share control circuit 600 by a current sensing resistor 122''' (FIG. 7). A voltage signal $V_9$ formed at a positive terminal of an offset circuit 402' illustrated in FIG. 6 can be given by: $V_9=[1+(-11)(V_{CS-}''')]$. Thus, the voltage $V_9$ is representative of a level of the current $I_O'''$ generated by the power supply module 700 (FIG. 7).

The voltage signal $V_9$ is provided to the LS_OUT terminal of the load share control circuit 600 and is compared by the transconductance amplifier 210" to a voltage signal $V_{10}$ which is provided to the load share control circuit 600 via its LS_IN terminal. The load share control circuit 600 adjusts the level of a signal $I_{FB}''$ formed at the output of the transconductance amplifier 210" according to a difference between the signals $V_9$ and $V_{10}$. The load share control circuit 600 develops a voltage $V_{11}$ at the non-inverting input of an amplifier 216". Similarly to the voltage $V_7$ formed by the load share control circuit 400 illustrated in FIG. 4, the voltage $V_{11}$ is influenced by the output voltage applied to the common node $V_{OUT}''$ and by the signal $I_{FB}''$. Thus, the output current $I_0'''$ (FIG. 7) is controlled based upon the voltage level of the common output node $V_{OUT}$ (FIG. 7) and upon the signal $I_{FB}''$.

The load share control circuit 600 is configured to allow power supply modules having a common output node $V_{OUT}$ to be coupled together in a variety of master/slave configurations as described herein. For example, the LS_OUT terminal of the power supply module 700 (FIG. 7) can be coupled to an LS_IN terminal of another power supply module so that the power supply module 700 is master relative the other power supply module. Similarly, the LS_IN terminal of the power supply module 700 can be coupled to an LS_OUT terminal of another power supply module so that the power supply module 700 is a slave relative the other power supply module. Because the connections to the LS_IN and LS_OUT terminals determine the master/slave relationships among modules, the amplifier 404, the diode 406 and the offset circuit 206' of the load share control circuit 400 of FIG. 4 is unnecessary for the load share control circuit 600 of FIG. 6.

When the LS_IN terminal of the power supply module 700 is coupled to the LS_OUT terminal of another power supply module, the other power supply module provides a one volt offset voltage via the LS_IN terminal of the power supply module 700 and also supplies a current $I_X$ drawn by the current source 604. Therefore, the voltage signal $V_{10}$ is typically higher than one volt and the current source 604 has a negligible effect on the level of the voltage signal $V_{10}$. This is because the current $I_X$ is drawn from the LS_OUT terminal of the other power supply module. The master detect circuit 602 detects that the level of the signal $V_{10}$ is higher than approximately one volt and, in response, maintains the transconductance amplifier 210" in its operational state. Accordingly, the power supply module 700 is a slave relative the power supply module coupled to the LS_IN terminal while the power supply module coupled to the LS_IN terminal is master relative the power supply module 700. In which case, the output current $I_O'''$ (FIG. 7) of the power supply module 700 is controlled by the master.

Otherwise, if the LS_IN terminal of the power supply module 700 has no connection, the current source 604 pulls the inverting input of the amplifier 210" to below approximately one volt and, in response, the master detect circuit 602 disables the transconductance amplifier 210". In such case, the signal $I_{FB}''$ is nearly zero and, thus, the signal $I_{FB}''$ will have a negligible effect on the level of $I_{OPTO}'''$. Therefore, the output current $I_O'''$ of the power supply module 700 is not controlled to match that of another power supply module, but instead, is controlled to regulate the output voltage at the node $V_{OUT}$. In such circumstances, the LS_IN terminal of the other power supply module can be coupled to the LS_OUT terminal of the power supply module 700 such that the other power supply module attempts to match the output current of the power supply module 700. Thus, the power supply module 700 is master relative the other power supply module.

Figure 8:
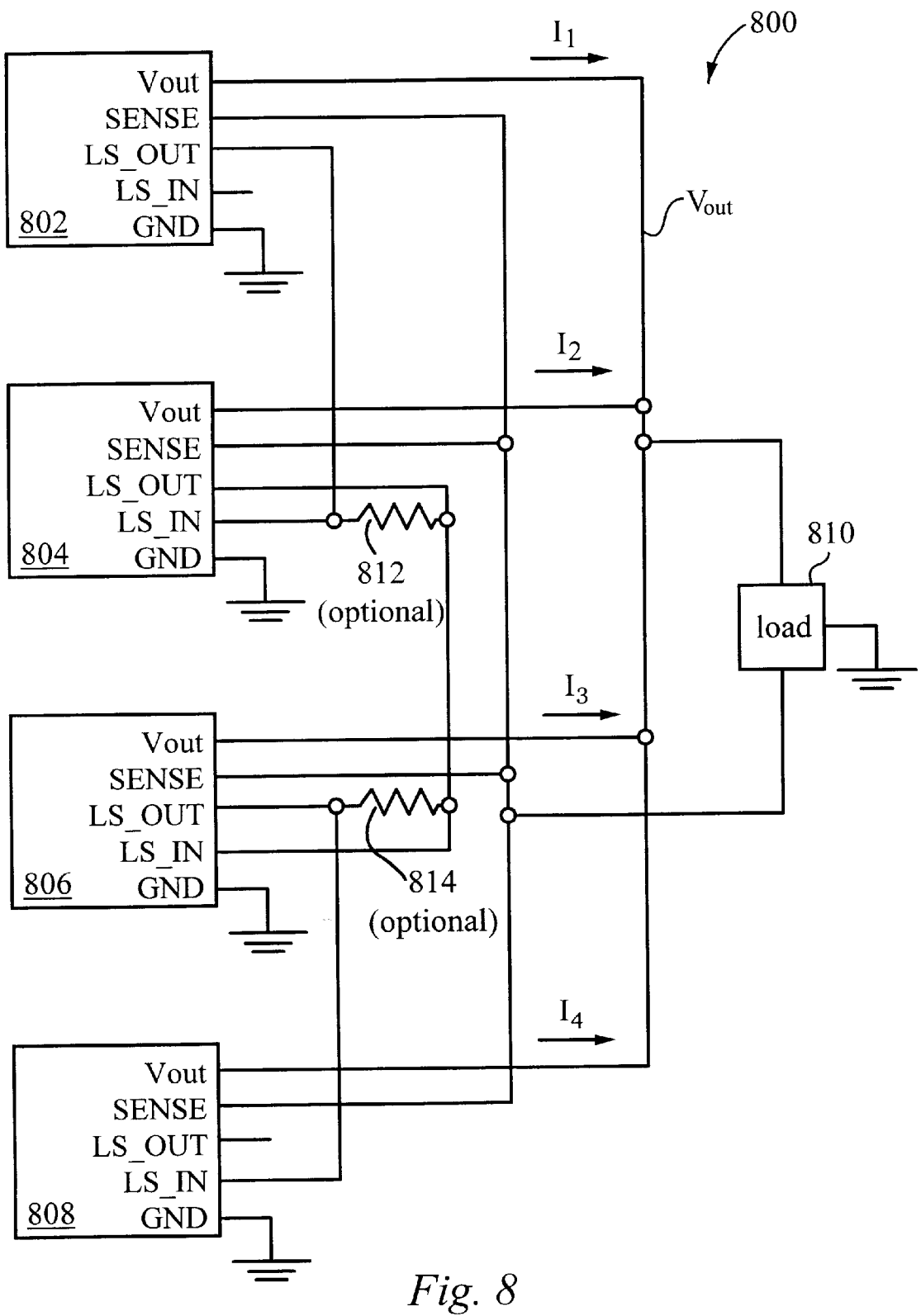
FIG. 8 illustrates a block schematic diagram of a modular load sharing power supply circuit having a plurality of power supply modules as illustrated in FIG. 7 cascaded in a line.

FIG. 8 illustrates a block schematic diagram of a modular load sharing power supply circuit 800 having a plurality of power supply modules 700 as illustrated in FIG. 7 cascaded in a line. Each of the plurality of power supply modules 802–808 can be identical to the power supply module 700 illustrated in FIG. 7. A $V_{OUT}$ terminal of each module 802–808 is coupled to a common output node $V_{OUT}$ and to a first terminal of a load 810. A second terminal of the load 810 is coupled to a SENSE terminal of each of the modules 802–808. A ground terminal $V_{SS}$ of each power supply module 802–808 is coupled to the ground node. The load 810 can be coupled to the ground node $V_{SS}$ or can be isolated such that the load 810 is referenced to another ground level.

An LS_IN terminal of the first power supply module 802 has no connection. Accordingly, the master detect circuit 602 (FIG. 3) included in the first power supply module 802 determines that the first power supply module 802 is to function as master and, in response, the master detect circuit 602 of the first power supply module 802 disables the transconductance amplifier 210" (FIG. 6) of the first power supply module 802. An output current $I_1$ of the first power supply module 802 is not controlled by another module. Rather, the first power supply module 802 adjusts its output current $I_1$ to maintain a desired output voltage at the node $V_{OUT}$.

An LS_OUT terminal of the first power supply module 802 is coupled to an LS_IN terminal of the second power supply module 804. Thus, the first power supply module 802 controls a level of current $I_2$ supplied by the second power supply module 804 such that the second power supply module 804 attempts to adjust its current output $I_2$ to match the current output $I_1$ of the first power supply module 802. An LS_OUT terminal of the second power supply module 804 is coupled to an LS_IN terminal of the third power supply module 806. Thus, the second power supply module 804 controls a level of current $I_3$ supplied by the third power supply module 806 such that the third power supply 806 module attempts to adjust its current output $I_3$ to match the current output $I_2$ of the second power supply module 804. Accordingly, the second power supply module 804 functions as a slave relative the first power supply module 802 and as a master relative the third power supply module 806.

An LS_OUT terminal of the third power supply module 806 is coupled to an LS_IN terminal of the fourth power supply module 808. Thus, the third power supply module 806 controls a level of current $I_4$ supplied by the fourth power supply module 806 such that the fourth power supply module 808 attempts to adjust its current output $I_4$ to match the current output $I_3$ of the third power supply module 806. Accordingly, the third power supply module 806 functions as a slave relative the second power supply module 804. The LS_OUT terminal of the fourth power supply module 808 has no connection. Thus, the fourth power supply module 808 functions only as a slave. The third power supply module 806 functions as master relative the fourth power supply module 808. It will be apparent that one or more additional power supply modules can be added to the power supply circuit 800 via the LS_OUT terminal of the fourth power supply module 808.

In the event that the first power supply module 802 should fail such that the voltage supplied by the first power supply module 802 to the LS_IN terminal of the second power supply module 804 falls to approximately one volt or less, the master detect circuit 602 (FIG. 6) of the second power supply module 804 detects this condition. In response, the master detect circuit 602 of the second power supply module 804 disables its transconductance amplifier 210" so that the second power supply module 804 assumes the role of master.

In the preferred embodiment, the LS_IN terminal and the LS_OUT terminal of the second power supply module 804 are coupled together via a resistor 812. In the event that the second power supply module 804 should fail such that the voltage provided to its LS_OUT is no longer appropriate for controlling the third power supply module 806, then the signal provided by the first power supply module 802 via its LS_OUT terminal will tend to control the third power supply module 806. Similarly, the LS_IN terminal and the LS_OUT terminal of the third power supply module 806 are coupled together via a resistor 814. Thus, if the third power supply module should fail such that the voltage provided to its LS_OUT terminal is no longer appropriate for controlling the fourth power supply module 808, then the signal provided by the second power supply module 804 via its LS_OUT terminal will tend to control the fourth power supply module 808. Thus, under conditions where each module 802–808 functions normally, the resistors 812, 814 do not significantly affect operation of the power supply circuit 800, however, should any of the modules 802–808 fail, the power supply circuit 800 continues to supply power to the load 810 at an appropriate voltage level.

Figure 9:
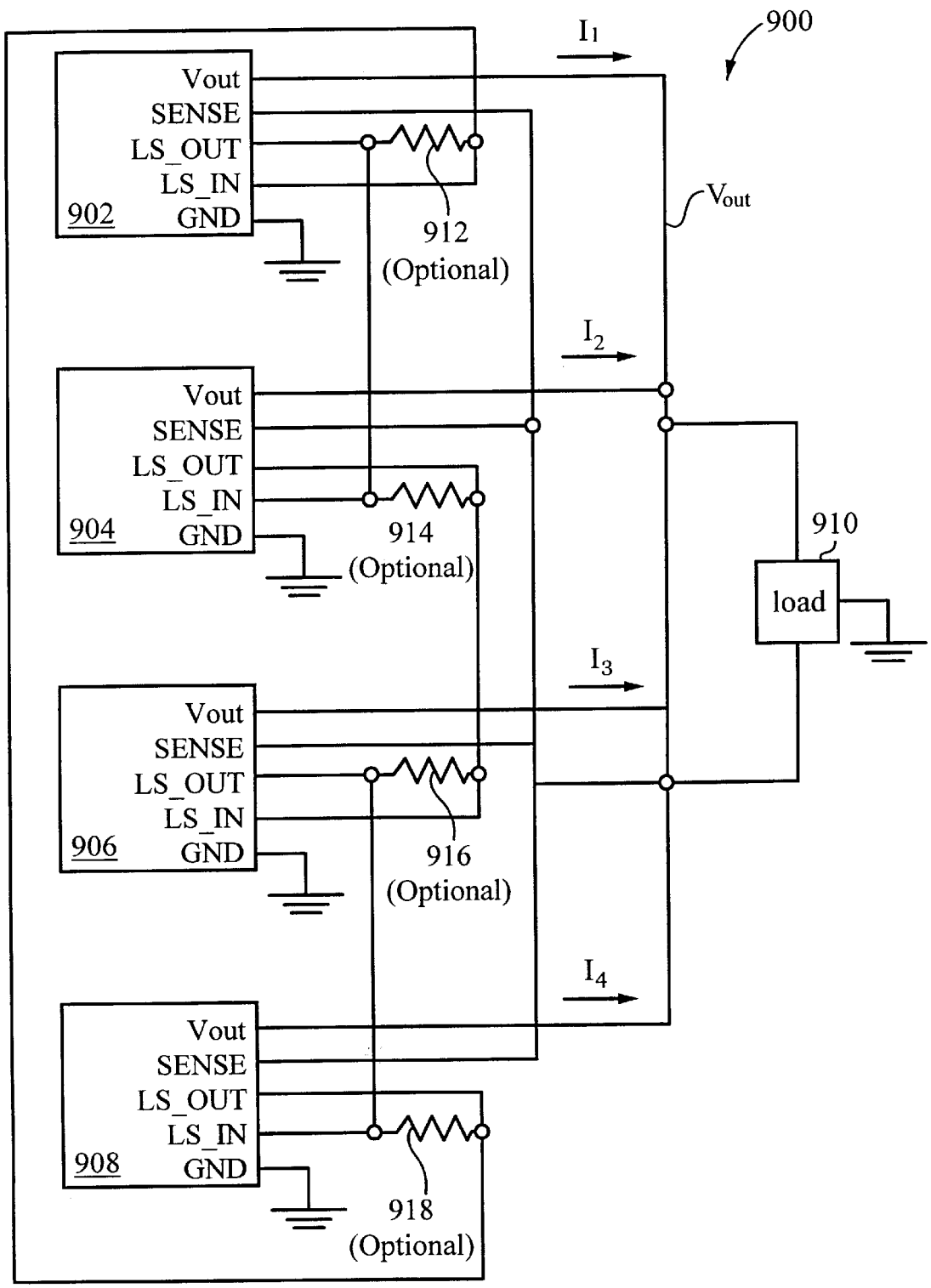
FIG. 9 illustrates a block schematic diagram of a modular load sharing power supply circuit having a plurality of power supply modules as illustrated in FIG. 7 cascaded in a loop.

FIG. 9 illustrates a block schematic diagram of a modular load sharing power supply circuit 900 having a plurality of power supply modules 700 as illustrated in FIG. 7 cascaded in a loop. Each of the plurality of power supply modules 902–908 can be identical to the power supply module 700 illustrated in FIG. 7. A $V_{OUT}$ terminal of each module 902–908 is coupled to a common output node $V_{OUT}$ and to a first terminal of a load 910. A second terminal of the load 910 is coupled to a SENSE terminal of each of the modules 902–908. A ground terminal $V_{SS}$ of each power supply module 902–908 is coupled to the ground node. The load 910 can be coupled to the ground node $V_{SS}$ or can be isolated such that the load 910 is referenced to another ground level.

An LS_OUT terminal of the first power supply module 902 is coupled to an LS_IN terminal of the second power supply module 904. Thus, the first power supply module 902 controls a level of current $I_2$ supplied by the second power supply module 904 such that the second power supply module 904 attempts to adjust its current output $I_2$ to match the current output $I_1$ of the first power supply module 902. An LS_OUT terminal of the second power supply module 904 is coupled to an LS_IN terminal of the third power supply module 906. Thus, the second power supply module 904 controls a level of current $I_3$ supplied by the third power supply module 906 such that the third power supply 906 module attempts to adjust its current output $I_3$ to match the current output of the second power supply module 904. Accordingly, the second power supply module 904 functions as a slave relative the first power supply module 902 and as a master relative the third power supply module 906.

An LS_OUT terminal of the third power supply module 906 is coupled to an LS_IN terminal of the fourth power supply module 908. Thus, the third power supply module 906 controls a level of current $I_4$ supplied by the fourth power supply module 906 such that the fourth power supply module 908 attempts to adjust its current output $I_4$ to match the current output $I_3$ of the third power supply module 906. The LS_OUT terminal of the fourth power supply module 908 is coupled to the LS_IN terminal of the first power supply module 902. Thus, the fourth power supply module 908 controls a level of current $I_3$ supplied by the first power supply module 902 such that the first power supply module 902 attempts to adjust its current output $I_1$ to match the current output $I_4$ of the fourth power supply module 908. Accordingly, the fourth power supply module 908 functions as a slave relative the third power supply module 906 and as a master relative the first power supply module 902. In addition, the first power supply module 902 functions as a slave relative the fourth power supply module 908 and as a master relative the first power supply module. Though a loop having four power supply modules is illustrated in FIG. 9, it will be apparent that more or less power supply modules can be coupled in a such a loop configuration.

Figure 10:
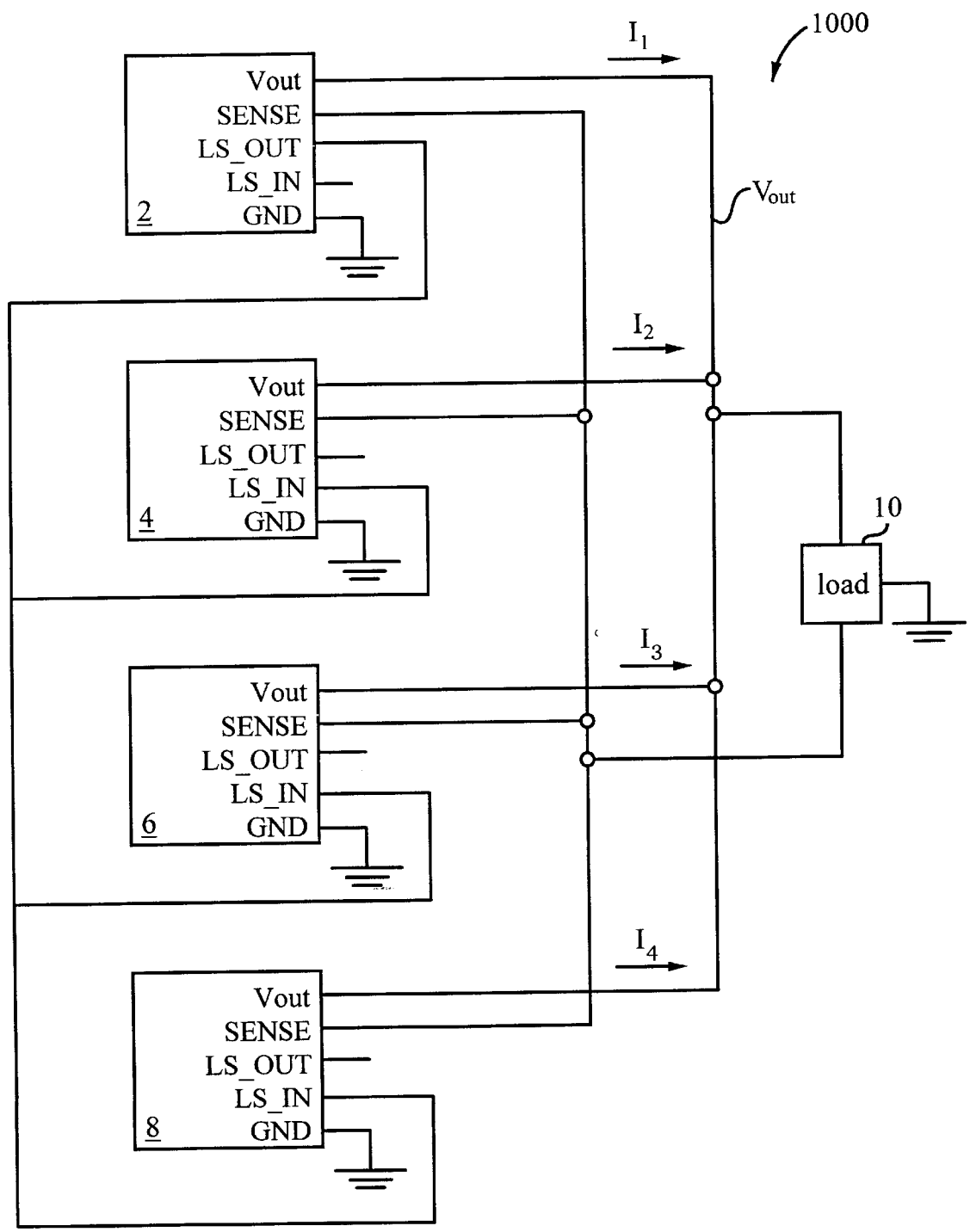
FIG. 10 illustrates a block schematic diagram of a modular load sharing power supply circuit having a plurality of power supply modules as illustrated in FIG. 7 cascaded in a tree.

In the preferred embodiment, the LS_IN terminal and the LS_OUT terminal of the first power supply module 902 are coupled together via a resistor 912. In the event that the first power supply module 902 should fail such that the voltage provided to its LS_OUT is no longer appropriate for controlling the second power supply module 904, then the signal provided by the fourth power supply module 902 via its LS_OUT terminal will tend to control the second power supply module 904. Similarly, the LS_IN terminal and the LS_OUT terminal of the second power supply module 904 are coupled together via a resistor 914; the LS_IN terminal and the LS_OUT terminal of the third power supply module 908 are coupled together via a resistor 916; and the LS_in terminal and the LS_OUT terminal of the fourth power supply module 908 are coupled together via a resistor 918. Thus, under conditions where each module 902–908 functions normally, the resistors 912–918 do not significantly affect operation of the power supply circuit 900, however, should any of the modules 902–908 fail, the power supply circuit 900 continues to supply power to the load 910 at an appropriate voltage level.xx FIG. 10 illustrates a block schematic diagram of a modular load sharing power supply circuit 1000 having a plurality of power supply modules 700 as illustrated in FIG. 7 cascaded in a tree. Each of the plurality of power supply modules 2–8 can be identical to the power supply module 700 illustrated in FIG. 7. A $V_{OUT}$ terminal of each module 2–8 is coupled to a common output node $V_{OUT}$ and to a first terminal of a load 10. A second terminal of the load 10 is coupled to a SENSE terminal of each of the modules 2–8. A ground terminal $V_{SS}$ of each power supply module 2–8 is coupled to the ground node. The load 10 can be coupled to the ground node $V_{SS}$ or can be isolated such that the load 10 is referenced to another ground level.

An LS_IN terminal of the first power supply module 2 has no connection. Accordingly, the master detect circuit 602 (FIG. 6) of the first power supply module 2 determines that the first power supply module 2 is to function as master and, in response, the master detect circuit 602 disables the transconductance amplifier 210" (FIG. 6) of the first power supply module 2. The output current $I_1$ of the first power supply module 2 is not controlled by another module. Rather, the first power supply module 2 adjusts its output current $I_1$ to maintain a desired output voltage at the node $V_{OUT}$.

An LS_OUT terminal of the first power supply module 2 is coupled to an LS_IN terminal of the second power supply module 4, to an LS_IN terminal of the third power supply module 6 and to an LS_IN terminal of the fourth power supply module. Thus, the first power supply module 2 controls a level of current $I_2$, $I_3$, $I_4$ supplied by each of the modules 4–8 such that each of the modules 4–8 attempts to adjust its current output $I_2$, $I_3$ or $I_4$, to match the current output $I_1$ of the first power supply module 2. Accordingly, the modules 4–8 each function as a slave relative the first power supply module 2.

Should one or more of the modules 4–8 fail such that it no longer supplies current to the load 10, or such that it supplies more than its proportionate share of current to the load, the remaining modules adapt to maintain an appropriate level of current to the load 10.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, current levels, and voltage levels disclosed herein. In addition, it will be apparent that the pulse-width modulation circuit 102 (102') and associated circuitry illustrated in FIGS. 1 or 4 can be replaced with another type of switching power supply circuit or a linear power supply circuit, with appropriate modifications.

What is claimed is:

1. A method of supplying power to a load, the method comprising steps of:
    a. providing a plurality of power supply modules each coupled to a common output node for supplying a respective output current to the load; and
    b. selecting one of the plurality of power supply modules as master by determining which of the plurality of power supply modules supplies a lowest level of current to the load wherein the remaining one or more of the plurality of power supply modules assume the role of slaves wherein each slave adjusts its respective output current to a level that is a predetermined amount above a level of current supplied by the master.

2. The method according to claim 1 further comprising a step of exchanging roles between the master and one of the slaves when the level of current supplied to the load by the master is no longer the lowest level of current.

3. The method according to claim 2 wherein none of the power supply modules is preconditioned as master.

4. The method according to claim 2 wherein any one of the power supply modules is capable of assuming the role of master of the remaining power supply modules.

5. The method according to claim 2 further comprising a step of preventing a newly inserted power supply module from assuming the role of master until after a current supplied by the newly inserted power supply module rises to a level that is at least as high as the level of current supplied by the master.

6. A modular power supply for supplying power to a load, the modular power supply comprising a plurality of power supply modules each coupled to a common output node for supplying power to the load and each coupled to a common control node wherein the one of the power supply modules which supplies a lowest level of current to the load assumes the role of master wherein the master controls the common control node by providing a signal to the common control node which is representative of a level of current supplied by the master and wherein the remaining one or more power supply modules assume the role of slaves wherein each slave monitors the common control node and, in response, adjusts its respective output current to a level that is a predetermined current level above the level of current supplied by the master.

7. The modular power supply according to claim 6 wherein none of the power supply modules is preconditioned as the master.

8. The modular power supply according to claim 6 wherein any one of the power supply modules is capable of assuming the role of master of the remaining power supply modules.

9. The modular power supply according to claim 6 further comprising a circuit for preventing a newly inserted power supply module from controlling the common control node until after a current supplied by the newly inserted power supply module rises to a level that is at least as high as the level of current supplied by the master.

10. The modular power supply according to claim 6 wherein the master comprises a voltage offset element for ensuring that the common control node is at least as high as a predetermined voltage level.

11. The modular power supply according to claim 10 wherein the predetermined voltage level is sufficient for forward biasing a diode included in the master and having its anode coupled to the common control node.

12. The modular power supply according to claim 11 wherein at least one diode is included in a slave, coupled to the common control node and reverse biased.

13. The modular power supply according to claim 12 wherein the diode included in the slave is forward biased when the slave assumes the role of master.

14. The modular power supply according to claim 6 wherein the master includes a transistor coupled to the common control node wherein the transistor included in the master is biased on.

15. The modular power supply according to claim 14 wherein at least one transistor is included in a slave, coupled to the common control node and biased off.

16. The modular power supply according to claim 15 wherein the transistor included in the slave is biased on when the slave assumes the role of master.

17. The modular power supply according to claim 6 wherein the master comprises:
    a. an amplifier having a first amplifier input, a second amplifier input and an amplifier output wherein the first amplifier input is coupled to receive a signal representative of the level of current provided to the load by the master; and
    b. a pnp bipolar transistor having a base, an emitter and a collector, wherein the base is coupled to the amplifier output and the emitter is coupled to the common control node and to the second amplifier input.

18. The modular power supply according to claim 17 wherein the emitter is coupled to receive a bias current and wherein the collector is coupled to a ground node.

19. A modular power supply for supplying power to a load, the modular power supply comprising:
    a. a first power supply module coupled to an output node for supplying power to the load wherein the first power supply module supplies a first output current to the load;
    b. a second power supply module coupled to the output node wherein the second power supply supplies a second output current to the load; and
    c. a control node coupled to the first power supply module and to the second power supply module wherein when the first output current is lower than the second output current, the first power supply module assumes the role of master and the second power supply module assumes the role of slave wherein a signal level for the control node is representative of the first output current and the second power supply module monitors the control node for controlling the second output current to remain a first predetermined level above the level of the first output current and when the second output current is lower than the first output current, the second power supply module assumes the role of master and the first power supply module assumes the role of slave wherein a signal level for the control node is representative of the second output current and the first power supply module monitors the control node for controlling the first output current to remain a second predetermined level above the level of the second output current.

20. The modular power supply according to claim 19 wherein the first power supply module includes a first feedback loop for controlling a voltage level of the output node and a second feedback loop for maintaining a predetermined proportional relationship between the first current and the second current.

21. The modular power supply according to claim 20 wherein the predetermined proportional relationship is adjusted according to a proportional relationship between a rated capacity of the first power supply module and a rated capacity of the second power supply module.

22. The modular power supply according to claim 19 wherein the first power supply module forms a first error signal which is representative of a difference between the signal level for the control node and the signal representative of the first current and wherein the first power supply module forms a second error signal which is representative of a difference between a voltage level of the output node and a desired voltage level for the output node.

23. The modular power supply according to claim 22 wherein the first output current is controlled according to the first error signal and the second error signal.

24. A power supply for supplying power to a load via an output node, the power supply including a first power supply module, the first power supply module having a control circuit, the control circuit comprising:

a. a first terminal for receiving a first signal that is representative of a first current supplied to the load by the first power supply module;

b. a second terminal for receiving a second signal that is representative of a second current supplied to the load by a master when the first power supply module is a slave and the second terminal for providing a third signal that is representative of the first current when the first power supply module is the master;

c. a diode having an anode, wherein the anode is coupled to the second input terminal;

d. means for forming a first error signal representative of a difference between the first current and the second current;

e. a third input terminal for receiving a fourth signal representative of an actual voltage level of the output node;

f. means for forming an second error signal representative of a difference between a desired voltage level for the output node and the actual voltage level of the output node;

g. means for forming a control signal according to the first error signal and the second error signal; and h. a first output terminal for providing the control signal to a voltage regulator.

25. The power supply according to claim 24 wherein the control circuit is an integrated circuit having eight pins.

26. The power supply according to claim 24 wherein the voltage regulator includes a pulse-width modulation circuit.

27. The power supply according to claim 24 wherein the first power supply module is the slave when the first current is higher than a current supplied to the load by a second power supply module.

28. The power supply according to claim 27 wherein the control circuit further comprises a circuit for preventing the first power supply module from providing the third signal until after a current supplied by the first power supply module rises to a level that is at least as high as the level of current supplied by the second power supply module when the first power supply module is a newly inserted power supply module.

29. A power supply for supplying power to a load via an output node, the power supply including a first power supply module, the first power supply module having a control circuit, the control circuit comprising:

a. a first input terminals for receiving a first signal that is representative of a first current supplied to the load by the first power supply module;

b. a second input terminal for receiving a second signal that is representative of a second current supplied to the load by a second power supply module;

c. means for forming a first error signal representative of a difference between the first current and the second current;

d. a third input terminal for receiving a third signal representative of an actual voltage level of the output node;

e. means for forming an second error signal representative of a difference between a desired voltage level for the output node and the actual voltage level of the output node;

f. means for forming a control signal according to the first error signal and the second error signal; and g. a first output terminal for providing the control signal to a voltage regulator.

30. The power supply according to claim 29 wherein the voltage regulator includes a pulse-width modulation circuit.

31. The power supply according to claim 29 further comprising the second power supply module wherein the control circuit controls the first current according to the second current.

32. The power supply according to claim 29 wherein the control circuit further comprises a second output terminal for providing the first error signal to a third power supply module.

33. The power supply according to claim 32 further comprising the third power supply module wherein the control circuit controls a third current supplied to the load by the third power supply module.

34. The power supply according to claim 33 further comprising a fourth power supply module coupled to the second output terminal wherein the control circuit controls a fourth current supplied to the load by the fourth power supply module.

35. The power supply according to claim 33 further comprising the second power supply module wherein the control circuit controls the first current according to the second current.

36. The power supply according to claim 35 wherein the third power supply module is coupled to the second power supply module for controlling the second current thereby coupling the first, second and third power supply modules in a loop.

37. The power supply according to claim 36 further comprising one or more additional power supply modules coupled in the loop.

38. A power supply for supplying power to a load via an output node, the power supply including a first power supply module, the first power supply module having a control circuit, wherein the control circuit is an integrated circuit having ten pins or fewer comprising:

a. a first input terminal for receiving a first signal that is representative of a first current supplied to the load by the first power supply module;
 b. a second input terminal for receiving a second signal that is representative of a second current supplied to the load by a second power supply module;
 c. means for forming a first error signal representative of a difference between the first current and the second current;
 d. a third input terminal for receiving a third signal representative of an actual voltage level of the output node;
 e. means for forming an second error signal representative of a difference between a desired voltage level for the output node and the actual voltage level of the output node;
 f. means for forming a control signal according to the first error signal and the second error signal; and
 g. a first output terminal for providing the control signal to a voltage regulator.

39. A power supply for supplying power to a load via an output node, the power supply including a first power supply module, the first power supply module having a control circuit, wherein the control circuit detects whether a second power supply module is coupled to a second input terminal, and, in response to detecting that the second power supply module is not coupled to the second input terminal, the control circuit disables a means for forming a first error signal, the control circuit comprising:

a. a first input terminal for receiving a first signal that is representative of a first current supplied to the load by the first power supply module;
 b. a second input terminal for receiving a second signal that is representative of a second current supplied to the load by a second power supply module;
 c. means for forming a first error signal representative of a difference between the first current and the second current;
 d. a third input terminal for receiving a third signal representative of an actual voltage level of the output node;
 e. means for forming an second error signal representative of a difference between a desired voltage level for the output node and the actual voltage level of the output node;
 f. means for forming a control signal according to the first error signal and the second error signal; and
 g. a first output terminal for providing the control signal to a voltage regulator.

* * * * *

UNITED STATES PATENT AND TRADEMARK OFFICE
CERTIFICATE OF CORRECTION

PATENT NO. : 6,166,455
DATED : December 26, 2000
INVENTOR(S) : Thomas Li

It is certified that error appears in the above-identified patent and that said Letters Patent is hereby corrected as shown below:

IN THE SPECIFICATION:

In Col. 5, line 16, replace "lead' with --load--.

In Col. 7, line 32, between "current" and "supplied", replace "10" with --$I_0$--.

In Col. 16, line 1, between "current" and "supplied", replace "$I_3$" with --$I_1$--.

IN THE CLAIMS:

In Col. 20, Claim 29, line 22, replace "terminals" with --terminal--.

Signed and Sealed this

Twenty-ninth Day of May, 2001

*Attest:*

NICHOLAS P. GODICI

*Attesting Officer*     *Acting Director of the United States Patent and Trademark Office*